(12) United States Patent
Washeleski et al.

(10) Patent No.: US 11,216,175 B2
(45) Date of Patent: Jan. 4, 2022

(54) USER INTERFACE WITH PROXIMITY DETECTION FOR OBJECT TRACKING

(71) Applicant: UUSI, LLC, Reed City, MI (US)

(72) Inventors: John M. Washeleski, Cadillac, MI (US); David W. Shank, Hersey, MI (US)

(73) Assignee: UUSI, LLC, Reed City, MI (US)

(*) Notice: Subject to any disclaimer, the term of this patent is extended or adjusted under 35 U.S.C. 154(b) by 0 days.

(21) Appl. No.: 16/820,613

(22) Filed: Mar. 16, 2020

(65) Prior Publication Data

US 2020/0225827 A1 Jul. 16, 2020

Related U.S. Application Data

(63) Continuation of application No. 14/028,941, filed on Sep. 17, 2013, now Pat. No. 10,592,092, which is a
(Continued)

(51) Int. Cl.
*G06F 3/0488* (2013.01)
*G06F 3/0354* (2013.01)
(Continued)

(52) U.S. Cl.
CPC ............ *G06F 3/0488* (2013.01); *B60K 35/00* (2013.01); *B60K 37/06* (2013.01);
(Continued)

(58) Field of Classification Search
CPC .... G06F 3/0488; G06F 3/04883; G06F 3/044; G06F 3/04886; G06F 3/017; G06F 3/013;
(Continued)

(56) References Cited

U.S. PATENT DOCUMENTS

| 4,766,368 A | 8/1988 | Cox |
| 4,825,385 A | 4/1989 | Dolph et al. |

(Continued)

FOREIGN PATENT DOCUMENTS

| EP | 2613232 A1 | 7/2013 |
| WO | 0127686 A1 | 4/2001 |

(Continued)

OTHER PUBLICATIONS

Kolokowsky, "Touchscreens 101: Understanding Touchscreen Technology and Design", (Jun. 2009), <URL: https://www.cypress.com/file/95156/download/>, p. 1-5 (Year: 2009).*
(Continued)

*Primary Examiner* — Mong-Shune Chung
(74) *Attorney, Agent, or Firm* — Howard & Howard Attorneys PLLC

(57) ABSTRACT

A system or method for tracking items proximate a user interface device include a user interface device having at least one solid-state touch-sensitive region and a receiver for wirelessly receiving a signal from at least one item to determine proximity of the item relative to the user interface device. The device may also include a display screen for displaying controls and information. The user interface device may be permanently or removably mounted in a vehicle and used to interface with vehicle systems and personal electronic devices. Tracked items or objects may include passive or active data tags and communicate identification information and optionally position information. The device may alert the user to movement of tracked objects, and/or confirm presence of a group of objects. The device may use various wired or wireless devices to control selections and/or a cursor on the display.

13 Claims, 8 Drawing Sheets

Related U.S. Application Data continuation of application No. 12/496,938, filed on Jul. 2, 2009, now Pat. No. 9,046,967.

(51) Int. Cl.
  *B60K 35/00* (2006.01)
  *B60K 37/06* (2006.01)
  *G06F 3/041* (2006.01)
  *G06F 3/044* (2006.01)

(52) U.S. Cl.
  CPC ........ *G06F 3/03547* (2013.01); *G06F 3/0446* (2019.05); *G06F 3/04166* (2019.05); *G06F 3/04883* (2013.01); *G06F 3/04886* (2013.01); *B60K 2370/569* (2019.05); *G06F 2203/04101* (2013.01)

(58) Field of Classification Search
  CPC .. B60K 2370/569; B60K 35/00; B60K 37/00; B60K 37/02
  See application file for complete search history.

(56) References Cited

U.S. PATENT DOCUMENTS

| | | | |
|---|---|---|---|
| 4,933,807 A | 6/1990 | Duncan | |
| 5,305,017 A | 4/1994 | Gerpheide | |
| 5,337,353 A | 8/1994 | Bole et al. | |
| 5,463,388 A | 10/1995 | Bole et al. | |
| 5,565,658 A | 10/1996 | Gerpheide et al. | |
| 5,621,290 A | 4/1997 | Heller et al. | |
| 5,730,165 A | 3/1998 | Philipp | |
| 5,801,340 A | 9/1998 | Peter | |
| 5,832,397 A | 11/1998 | Yoshida et al. | |
| 5,952,801 A | 9/1999 | Boisvert et al. | |
| 5,986,421 A | 11/1999 | Fukazawa et al. | |
| 6,064,165 A | 5/2000 | Boisvert et al. | |
| 6,144,114 A | 11/2000 | Chutorash | |
| 6,233,872 B1 | 5/2001 | Giagow et al. | |
| 6,337,549 B1 | 1/2002 | Biedin | |
| 6,346,935 B1 | 2/2002 | Nakajima et al. | |
| 6,377,009 B1 | 4/2002 | Philipp | |
| 6,389,752 B1 | 5/2002 | Rosenau | |
| 6,404,158 B1 | 6/2002 | Boisvert et al. | |
| 6,499,359 B1 | 12/2002 | Washeleski et al. | |
| 6,555,982 B2 | 4/2003 | Tyckowski | |
| 6,782,759 B2 | 8/2004 | Shank et al. | |
| 6,936,986 B2 | 8/2005 | Nuber | |
| 6,946,853 B2 | 9/2005 | Gifford et al. | |
| 6,968,746 B2 | 11/2005 | Shank et al. | |
| 7,015,666 B2 | 3/2006 | Staus | |
| 7,030,860 B1 | 4/2006 | Hsu et al. | |
| 7,038,414 B2 | 5/2006 | Daniels et al. | |
| 7,132,642 B2 | 11/2006 | Shank et al. | |
| 7,162,928 B2 | 1/2007 | Shank et al. | |
| 7,293,467 B2 | 11/2007 | Shank et al. | |
| 7,312,591 B2 | 12/2007 | Washeleski et al. | |
| 7,342,373 B2 | 3/2008 | Newman et al. | |
| 7,421,321 B2 | 9/2008 | Breed et al. | |
| 7,449,852 B2 | 11/2008 | Washeleski et al. | |
| 7,471,334 B1 | 12/2008 | Stenger | |
| 7,518,327 B2 | 4/2009 | Newman et al. | |
| 7,576,631 B1 | 8/2009 | Bingle et al. | |
| 7,653,883 B2 | 1/2010 | Hotelling et al. | |
| 7,813,025 B2 | 10/2010 | Ribi | |
| 8,040,326 B2 | 10/2011 | Hotelling et al. | |
| 9,415,689 B2* | 8/2016 | Waller .................. B60K 35/00 |
| 2001/0052839 A1 | 12/2001 | Nahata et al. | |
| 2002/0039008 A1 | 4/2002 | Edgar et al. | |
| 2002/0055811 A1 | 5/2002 | Obradovich | |
| 2002/0070862 A1 | 6/2002 | Francis et al. | |
| 2002/0152010 A1 | 10/2002 | Colmenarez et al. | |
| 2002/0190961 A1 | 12/2002 | Chen | |
| 2004/0046452 A1 | 3/2004 | Suyama et al. | |
| 2004/0056842 A1 | 3/2004 | Iisaka et al. | |
| 2004/0119688 A1 | 6/2004 | Troxell et al. | |
| 2004/0233677 A1 | 11/2004 | Su et al. | |
| 2005/0012484 A1 | 1/2005 | Gifford et al. | |
| 2005/0251314 A1 | 11/2005 | Schindler et al. | |
| 2006/0006701 A1 | 1/2006 | Wells | |
| 2006/0097991 A1 | 5/2006 | Hotelling et al. | |
| 2006/0161871 A1 | 7/2006 | Hotelling et al. | |
| 2006/0229811 A1 | 10/2006 | Herman et al. | |
| 2006/0238517 A1 | 10/2006 | King et al. | |
| 2007/0075986 A1 | 4/2007 | Chen | |
| 2007/0152615 A1 | 7/2007 | Newman et al. | |
| 2007/0257890 A1 | 11/2007 | Hotelling et al. | |
| 2007/0273560 A1 | 11/2007 | Hua et al. | |
| 2008/0048997 A1 | 2/2008 | Gillespie et al. | |
| 2008/0147308 A1 | 6/2008 | Howard et al. | |
| 2009/0079705 A1 | 3/2009 | Sizelove et al. | |
| 2009/0132130 A1* | 5/2009 | Kumon ................ G01C 21/365 701/49 |
| 2009/0144622 A1 | 6/2009 | Evans et al. | |
| 2009/0179988 A1 | 7/2009 | Reibel et al. | |
| 2009/0193361 A1 | 7/2009 | Lee et al. | |
| 2009/0198420 A1 | 8/2009 | Newman et al. | |
| 2009/0210110 A1 | 8/2009 | Dybalski et al. | |
| 2009/0219134 A1 | 9/2009 | Nakasato et al. | |
| 2009/0244017 A1 | 10/2009 | Pala et al. | |
| 2009/0309851 A1 | 12/2009 | Bernstein | |
| 2010/0001971 A1 | 1/2010 | Jiang et al. | |
| 2010/0097346 A1 | 4/2010 | Sleeman | |
| 2010/0188248 A1 | 7/2010 | Sultan et al. | |
| 2010/0188343 A1 | 7/2010 | Bach | |
| 2010/0222939 A1 | 9/2010 | Namburu et al. | |
| 2010/0260350 A1 | 10/2010 | Chutorash et al. | |
| 2010/0295670 A1* | 11/2010 | Sato ........................ B60Q 3/12 340/458 |
| 2010/0295812 A1 | 11/2010 | Burns et al. | |
| 2010/0302201 A1 | 12/2010 | Ritter | |
| 2011/0080363 A1 | 4/2011 | Kao et al. | |
| 2011/0206239 A1* | 8/2011 | Wada .................. A61B 5/6887 382/103 |
| 2011/0246026 A1 | 10/2011 | Shuster | |
| 2012/0038559 A1 | 2/2012 | Radivojevic et al. | |
| 2012/0316702 A1 | 12/2012 | Liu | |
| 2013/0307771 A1 | 11/2013 | Parker et al. | |
| 2014/0028542 A1* | 1/2014 | Lovitt .................... G06F 3/017 345/156 |
| 2014/0300561 A1 | 10/2014 | Waller et al. | |
| 2016/0089084 A1* | 3/2016 | Sugiyama ................ A61B 5/25 600/372 |

FOREIGN PATENT DOCUMENTS

| | | |
|---|---|---|
| WO | 0212669 | 2/2002 |
| WO | 0227132 A1 | 4/2002 |
| WO | 03038220 | 5/2003 |
| WO | 2005114369 A2 | 12/2005 |

OTHER PUBLICATIONS

Buxton, B., "31.1: Invited Paper: A Touching Story: A Personal Perspective on the History of Touch Interfaces Past and Future," Society for Information Display (SIDS) Symposium Digest of Technical Papers, vol. 41, No. 1, Session 31, May 2010, pp. 444-448.

Hinckley, K., et al., "38.2: Direct Display Interaction via Simultaneous Pen + Multi-touch Input," Society for Information Display (SID) Symposium Digest of Technical Papers, vol. 41, No. 1, Session 38, May 2010, pp. 537-540.

Lee, S., "A Fast Multiple-Touch-Sensitive-Input Device," University of Toronto, Department of Electrical Engineering, Master Thesis, Oct. 1984, 118 pages.

Hillis, W.D., "A High-Resolution Imaging Touch Sensor," The International Journal of Robotics Research, vol. 1, No. 2, Summer Jun.-Aug. 1982, pp. 33-44.

Lee, S.K., et al., "A Multi-Touch Three Dimensional Touch-Sensitive Tablet," Proceedings of the SIGCHI Conference on Human Factors in Computing Systems, Apr. 1985, pp. 21-25.

(56) References Cited

OTHER PUBLICATIONS

Hlady, A.M., "A touch sensitive X-Y position encoder for computer input, "Proceedings of the Fall Joint-Computer Conference, Nov. 18-20, 1969, pp. 545-551.
Sasaki, L., et al., "A Touch-Sensitive Input Device," International Computer Music Conference Proceedings, Nov. 1981, pp. 293-296.
Callaghan, J., et al., "An Empirical Comparison of Pie vs. Linear Menus," Human Factors in Computing Systems Chicago '88 Conference Proceedings: May 15-19, 1988, Washington DC: Special Issue of the SIGCHI Bulletin, New York, Association for Computing Machinery, pp. 95-100.
Casio, AT-550 Advertisement, published in Popular Science by on the Run, Feb. 1984, p. 129.
Casio, "Module No. 320," AT-550 Owner's Manual, at least as early as Dec. 1984, 14 pages.
Smith, S.D., et al., "Bit-slice microprocessors in h.f. digital communications," The Radio and Electronic Engineer, vol. 51, No. 6, Jun. 1981, pp. 29-301.
Boie, R.A., "Capacitive impedance Readout Tactile Image Sensor," Proceedings of the IEEE International Conference on Robotics and Automation, vol. 1, Mar. 1984, pp. 370-372.
Thompson, C., "Clive Thompson on The Breakthrough Myth," Wired Magazine, http://www.wires.com/magazine/2011/07/st_thompson_breakthrough, Aug. 2011, 3 pages.
"Innovation in Information Technology," National Research Council of the National Academies, Computer Science and Telecommunications Board, Division of Engineering and Physical Sciences, http://www.nap.edu/catalog/10795.html, 2003, 85 pages.
Buxton, W., et al., "Issues and Techniques in Touch-Sensitive Tablet Input," Proceedings of SIGGRAPH '85, vol. 19, No. 3, Jul. 22-26, 1985, pp. 215-223.
Buxton, W., et al., "Large Displays in Automotive Design," IEEE Computer Graphics and Applications, Jul./Aug. 2000, pp. 68-75.
Buxton, W., "Lexical and Pragmatic Consideration of Input Structures," ACM SIGGRAPH Computer Graphics, vol. 17, No. 1, Jan. 1983, pp. 31-37.
Betts, P., et al., "Light Beam Matrix Input Terminal," IBM Technical Disclosure Bulletin, Oct. 1966, pp. 493-494.
Buxton, B., "Multi-Touch Systems that I Have Known and Loved," downloaded from http://www.billbuxton.com/multitouchOverview.html, Jan. 12, 2007, ww pages.
Herot, C.F., et al., "One-Point Touch Input of Vector Information for Computer Displays," Proceedings of the 5th Annual Conference on Computer Graphics and Interactive Techniques, Aug. 23-25, 1978, pp. 210-216.
Wolfeld, J.A., "Real Time Control of a Robot Tacticle Sensor," University of Pennsylvania, Department of Computer & Information Science, Technical Reports (CIS), Master Thesis, http://respository.upenn.edu/cis reports/678, Aug. 1981, 68 pages.
Lewis, J.R., "Reaping the Benefits of Modern Usability Evaluation: The Simon Story," Advances in Applied Ergonomics: Proceedings of the 1st International Conference on Applied Ergonomics, ICAE May 21-24, 1996, pp. 752-755.
Narkatani, L.H., et al., "Soft Machines: A Philosophy of User-Computer Interface Design," Proceedings of the SIGCHI Conference on Human Factors in Computing Systems, Dec. 1983, Chicago, pp. 19-23.
Rubine, D.H., "The Automatic Recognition of Gestures," Carnegie Mellon University, Master Thesis, CMU-CS-91-202, Dec. 1991, 285 Pages.
Kurtenbach, G.P., "The Design and Evaluation of Marking Menus," University of Toronto, Graduate Department of Computer Science, Master Thesis, May 1993, 201 pages.
Hopkins, D., "The Design and Implementation of Pie Menus," originally published in Dr. Dobb's Journal, Dec. 1991, lead cover story, user interface issue, reproduced at www.DonHopkins.com, 8 pages.
Buxton, B., "The Long Nose of Innovation," Bloomberg Businessweek, Innovation & Design, Jan. 2, 2008, 3 pages, downloaded from http://www.businessweek.com/stories/2008-01-02/the-long-nose-of-innovationbusinessweek-business-news-stock-market-and-financialadvice.
Buxton, B., "The Mad Dash Toward Touch Technology," Bloomberg Businessweek, Innovation & Design, Oct. 21, 2009, 3 pages, downloaded from: http://www.businessweek.com/innovate/content/oct2009/d20091021_629186.htm.
"The Sensor Frame Graphic Manipulator," NASA Phase II Final Report, NASA-CR-194243, May 8, 1992, 28 pages.
Izadi, S., et al., "ThinSight: A Thin Form-Factor Interactive Surface Technology, "Communications of the ACM, Research Highlights, vol. 52, No. 12, Dec. 2009, pp. 90-98.
Krueger, M.W., et al., "VIDEOPLACE—An Artificial Reality," Proceedings of the SIGCHI Conference on Human Factors in Computing Systems, Apr. 1985, pp. 35-40.
Brown, E., et al., "Windows on Tablets as a Means of Achieving Virtual Input Devices," Proceedings of the IFIP TC13 Third International Conference on Human-Computer Interaction, Aug. 27-31, 1990, in D. Diaper, et al. (Eds), Human-Computer Interaction—INTERACT '90, Amsterdam: Elsevier Science Publishers B.V. (North Holland), 11 pages.
"A Multi-Touch Three Dimensional Touch-Sensitive Tablet," http://www.youtube.com/watch?v=Arrus9CxUiA, Nov. 18, 2009, 1 page.
"Casio AT-550 Touch Screen Calculator Watch (1984)," http://www.youtube.com/watch?v=UhVAsqhfhqU, May 24, 2012, 1 page.
Wikipedia, "Indium tin oxide", (Mar. 29, 2019), <URL https://web.archive.org/web/20100429134539/http://en.wikipedia.org/wiki/Indium_tin_oxide/> p. 1-3.
Kolokowsky, et al., Touchscreens 101: Understanding Touchscreen Technology and Design, Cypress Perform, http://www.planetanalog.com, 5 pages, Planet Analog.

\* cited by examiner

USER INTERFACE WITH PROXIMITY DETECTION FOR OBJECT TRACKING

CROSS-REFERENCE TO RELATED APPLICATION(S)

The present application is a continuation of U.S. Ser. No. 14/028,941, filed Sep. 17, 2013, which is a continuation-in-part of U.S. Ser. No. 12/496,938, filed Jul. 2, 2009 (now U.S. Pat. No. 9,046,967, issued Jun. 2, 2015), the entire disclosures of which are hereby expressly incorporated by reference.

TECHNICAL FIELD

The present disclosure relates to systems and methods for detecting proximity of one or more objects relative to a user interface.

DESCRIPTION OF THE RELATED ART

A vehicle, such as an automobile, truck, boat, and the like typically includes one or more user interfaces accessible by occupants including an operator and/or passengers for displaying information and providing input for various accessories located in and/or around the vehicle. A user interface may include one or more controls that an occupant uses to control an accessory, in addition to a display for displaying status information for the vehicle and/or an accessory. In addition to accessories mounted in the vehicle, a user interface may be used to control portable accessories for the vehicle or occupants, such as personal electronic devices. As one example, a vehicle user interface may be used to control a wirelessly linked mobile phone when detected within proximity of the vehicle. As with the accessories, the user interface may be mounted in the vehicle, or may be portable. For example, a portable remote starter key fob with status display may be used to start the vehicle. Similarly, a hand-held user interface may be used to control an audio/video system or stereo system that may be permanently or removably mounted in the vehicle, for example.

User interfaces may be used in general-purpose passenger vehicles, as well as special-purpose commercial or industrial vehicles, to provide input to various types of devices or accessories associated with the vehicle operation or purpose. For example, delivery vehicles may include hand-held bar code readers to identify and track packages. Such tools may be independent of the vehicle, or may interface with one or more vehicle systems, such as a vehicle cellular or satellite communications system to send or receive delivery information, for example. The bar code reader functions as a user interface or input device to provide information to the operator or to a remote location, such as a central dispatch computer, for example. Information may include the status of a particular package, the source, destination, etc. and is typically manually updated by the driver when scanning a bar code or similar packaging identifying information.

In various types of vehicles, one user interface, referred to as the instrument cluster, is located behind the steering wheel for access by the operator of the vehicle. Another user interface, referred to as the center stack console, is accessible to the operator and any front seat passengers. Other areas of a vehicle that may have user interfaces for control and/or information display include door armrests, where window, minor, and security controls may be placed, and overhead consoles where sunroof and interior lighting controls may be placed, for example. Of course, the particular type of user interface and its location may vary depending on the type of information displayed or accessory being controlled across a wide variety of applications.

Various user interfaces, such as the center stack console, for example, may include controls and a display associated with multiple accessories, such as audio, navigation, and climate control (heating, ventilating, and air conditioning) accessories, for example. The surface of the user interface is divided into adjacent areas each being associated with an accessory. Each area of the user interface has controls positioned adjacent to a portion of the display. Many of the controls are typically implemented as mechanical switches such as pushbutton switches, rockers, slide switches, and rotary switches that an operator uses to control various functions of the corresponding accessories. These switches operate using mechanical mechanisms to complete electrical contact. As a result, mechanical switches may exhibit reduced performance over time as activation causes wear on moving components and electrical contacts. Switch reliability declines and contacts may become intermittent with continued use. In addition, repeated physical contact may lead to deterioration of switch face legends and graphics. Mechanical switches are also susceptible to contamination from external matter like dirt, food, and liquids. Ultimately, mechanical switches are expensive for automotive use. In today's automobile, mechanical switches as the controls for vehicle accessories are responsible for some $400 or so of the automobile cost.

In addition to inherent physical limitations and cost, mechanical switches present constraints to automotive ergonomics and aesthetics by limiting vehicle styling and layout options. In particular, mechanical switches are permanently fixed, numerous, and occupy relatively large portions of the surface of the user interface. For example, a standard HVAC system requires controls for adjusting vent selection, blower motor speed, temperature, etc. The controls may be doubled to accommodate individual comfort control between the driver and a passenger. In a luxury class vehicle, the HVAC system may further require controls for heated mirrors, heated seats, rear passenger air flow, etc.

As vehicle accessories are augmented with additional features, the user interface used to control these accessories becomes increasingly complex. Additional accessory features are accompanied by more controls and adding mechanical switches may increase the size of the interface. If the interface has a display associated with the accessory, expansion of the control interface may be necessary to accommodate operator control of the additional features. Together, the mechanical switches and the displays of a control interface consume valuable space of the surface of the control interface and increase overall cost.

Mechanical switches should be arranged to provide comprehensive and intuitive accessory control for the user. Excessive buttons or knobs clutter the interface and may result in the operator hunting for a desired switch. Sophisticated multi-function control knobs, those with switches that activate by tilting, pivoting, or swiveling, may have obscure functions and may be difficult to maneuver for some operators. Furthermore, sophisticated control knobs have many intricate parts making them expensive and prone to failure.

SUMMARY

A system or method for tracking items proximate a user interface device include a user interface having at least one touch-sensitive region and a receiver for wirelessly receiving a signal from at least one item to determine proximity of the item relative to the user interface device.

In one embodiment, a system or method includes a user interface device having a sealed housing containing a display screen having an input region with user touch detected based on capacitive coupling. Other embodiments include detection of user touch using acoustic, optical, and/or combination strategies such as surface acoustic wave (SAW), photo detection, and the like. According to various embodiments of the present disclosure, items or objects include a passive or active data tag and directly or indirectly communicate at least identification information to the user interface device. The interface device may determine location, presence, and/or proximity of the item based on the communication and display status information for the identified objects, which may include the presence or absence of a particular object or group of objects within a corresponding designated proximity of the user interface device. The user interface device may be permanently or removably mounted in a vehicle and powered by a vehicle battery, internal battery, and/or AC power, for example. In one embodiment, a user interface device communicates with a remote input device, such as a position controller or pointer device that may be implemented by a touch pad, track ball, stylus, or similar device mounted in a vehicle. One embodiment includes a remote input device implemented by a steering wheel mounted track ball in wired or wireless communication with the user interface device. Another embodiment includes a remote input device implemented by a touch pad mounted on a steering wheel of a vehicle.

Various embodiments of the present disclosure include a user interface device having a touch pad secured to a generally transparent or translucent faceplate by a refractive index matched adhesive to reduce visibility of touch pad components through the faceplate. The user interface device may be used in a variety of applications including logistics management, object tracking, and/or vehicle/personal accessories control, for example.

Embodiments of a system or method according to the present disclosure include various advantages. For example, use of an input device incorporating a solid-state touch sensitive surface improves robustness and longevity. Touch sensitive input devices according to the present disclosure may be mounted behind the surface of relatively thick non-conductive materials, such as glass, and are thus unaffected by external contamination, which facilitates portable use for various commercial and industrial applications, for example. In some applications, flexible construction of capacitive touch pads can be used to better accommodate ergonomic and aesthetic design considerations. Various embodiments include optically transparent touch pads to facilitate overlaying of the touch pad on a corresponding display of the user interface device, which may reduce the surface area required for controls and/or input devices. Furthermore, overlay construction is amenable to direct visual feedback of touch switch activation. Touch sensitive surfaces or regions can be arranged to create custom control interfaces to supplant virtually any kind of input or control device, including single button switches, dials, multi-point inputs, keyboards, position controllers, etc.

In addition to accessories mounted in a vehicle, various types of portable accessories may be manipulated using a touch sensitive user interface according to the present disclosure. The user interface may be permanently or removably mounted in the vehicle and used to control and display information associated with vehicle accessories and/or personal electronic devices used in or around a vehicle. For example, the expanding market of personal electronic devices and associated remote wireless access and communications capabilities enables remote access to vehicle accessory systems. Conversely, many vehicles are capable of communicating with and controlling personal portable electronics via a user interface of the vehicle, such as a vehicle voice recognition system used to control a mobile phone wirelessly linked to the vehicle user interface. Embodiments may include a vehicle mounted input device such as a touch pad or track ball in communication with a user interface device to facilitate use of the user interface device by vehicle occupants.

Embodiments of a touch sensitive user interface that employ mutual capacitance according to the present disclosure are capable of single point and multipoint sensing of human touch through relatively thick non-conductive surfaces. Mutual capacitance sensing also facilitates touch detection through thick surfaces including any combination of natural or synthetic material such as glass, plastic, wood, rubber, and leather up to one quarter inch thick.

A user interface according to the present disclosure may provide single and/or multiple sensing regions (e.g., capacitive touch switches, touch pads) located at desired touch points on the surface of the user interface to create unique surface locations that when touched generate single point, multipoint, or two-dimensional coordinate information, for example.

Embodiments according to the present disclosure may use optically transparent materials including Indium Tin Oxide (ITO), clear conductive polymers, or other such materials to provide a touch sensitive region of the user interface over a display of the interface. The ITO may be applied directly to the surface to create the desired touch sensitive regions, or applied to a substrate film layer, such as a polyester layer, which is then affixed to the surface of the interface. Touch pads can be constructed on single or multiple substrate layers to achieve desired layout and performance characteristics. For applications not requiring transparent control surfaces, more conventional translucent or opaque materials such as metal foil, conductive ink, metal film, or conductive epoxy may be used.

In other embodiments, a user interface for controlling vehicle accessories includes capacitive touch regions integrated with a display device to create visual feedback in response to detecting a touch (contact or proximity) of a user using mutual capacitance detection strategies to facilitate placement of the sensing layer on the internal side of a display surface. Mutual capacitance technology according to the present disclosure facilitates placement of touch pads behind, in front of, or within thicker display surfaces, such as glass, while providing multi-touch point recognition. In addition, touch sensitive regions can be tailored to follow intricate contours of the surface of the user interface and can be made transparent for overlaying a display. Sensitivity thresholds for touch pads can be increased to detect user presence prior to actual contact with the surface of the user interface. This proximity detection capability permits displays to remain inactive, dimmed, or hidden until an approaching object, such as a human finger, is detected. When the object is sensed, the display brightens or becomes active prior to actual contact with the touch sensitive region. Mutual capacitance techniques also facilitate recognition of various types of inputs, such as a single point, multipoint simultaneous, multipoint sequential, and/or multipoint gestural inputs corresponding to sensor proximity and/or contact. Using multiple touch switch inputs, gesturing can be detected and processed into corresponding operator input commands. Multiple gesture interpretation can be recognized and processed to create consecutive or simultaneous macro command sequences for controlling vehicle accessories.

Embodiments of a user interface according to the present disclosure facilitate sharing of electrical interface hardware and input controls of the user interface for multiple vehicle accessories and/or multiple personal electronic accessories. This facilitates input/control and output/display for multiple vehicle accessories from a common, programmable interface that can be removably or permanently mounted in a vehicle, such as within an instrument cluster or center stack console, for example.

Various embodiments of a user interface according to the present disclosure may provide customized and/or restricted access to various functions in response to one or more occupant and/or vehicle status indicators. For example, one embodiment includes a conductor disposed within a vehicle seat with an electrical signal applied to the conductor to act as a carrier or signature signal that is detected by the user interface during proximity or surface contact to determine which occupant is manipulating the user interface. The user interface may control accessibility to various functions and/or may customize the user interface display and controls based on which occupant is manipulating the user interface. In addition, various other vehicle and/or ambient status information may be used to determine the user interface configuration, display features, and/or available functions, for example.

Embodiments of a system or method according to the present disclosure may also include a user interface having wireless communications capabilities. In one embodiment, a user interface provides remote access and control over vehicle accessories and/or personal electronic devices. The user interface provides a touch sensitive control and display for personal electronics in addition to remote access to vehicle accessories. In another embodiment, a user interface communicates with one or more items or objects having a passive or active data tag to determine proximity of the object(s) to the user interface device. In one embodiment, the user interface device identifies an object or group of objects within a selected proximity and generates an alert signal in response. The alert signal may be used to identify an object that is not within the selected proximity, or to indicate that a defined group of objects are within the selected proximity, for example.

An embodiment of a user interface system or detection method according to the present disclosure may also include a user interface system that incorporates at least one camera to determine a user's gesture. For example, one embodiment would use a camera pointed to the driver of the vehicle. The camera would feed video directly to the user interface system and the user interface system would recognize various gestures such as, eye movement, head turns, shoulder shrugs, hand or finger movements, and the like and process those movements into commands. In another example the camera would be located in the rear lift gate of the vehicle and the camera could be used in conjunction with a user interface to create a keyless entry system that could recognize the user or a user gesture such as eye movement, head turns, shoulder shrugs, hand or finger movements, and the like to unlock and open the lift gate as the user approaches.

The system camera, monitoring and control when used with ignition off, creates vehicle battery drain if the camera is directly connected to the vehicle battery source. One embodiment of a camera power system can overcome the system power consumption by including a rechargeable battery that is charged by a combination of the vehicle electrical system and a solar cell attached to the camera assembly. For example, during ignition off the keyless entry system is active thereby allowing power to the camera, for identifying a user by gesture, from the rechargeable battery without drain to the vehicle battery. The rechargeable battery is subsequently recharged by the vehicle electrical system when the engine is running. For periods of extended time between engine starts the solar cell is used to recharge the battery. The combination of vehicle or solar charging allows the camera battery to be sized to reduce cost and space.

The above embodiments, features, and advantages as well as other embodiments, features, and advantages of a system or method according to the present disclosure will be readily apparent to one of ordinary skill in the art from the following detailed description taken in connection with the accompanying drawings.

DETAILED DESCRIPTION

Figure 1:
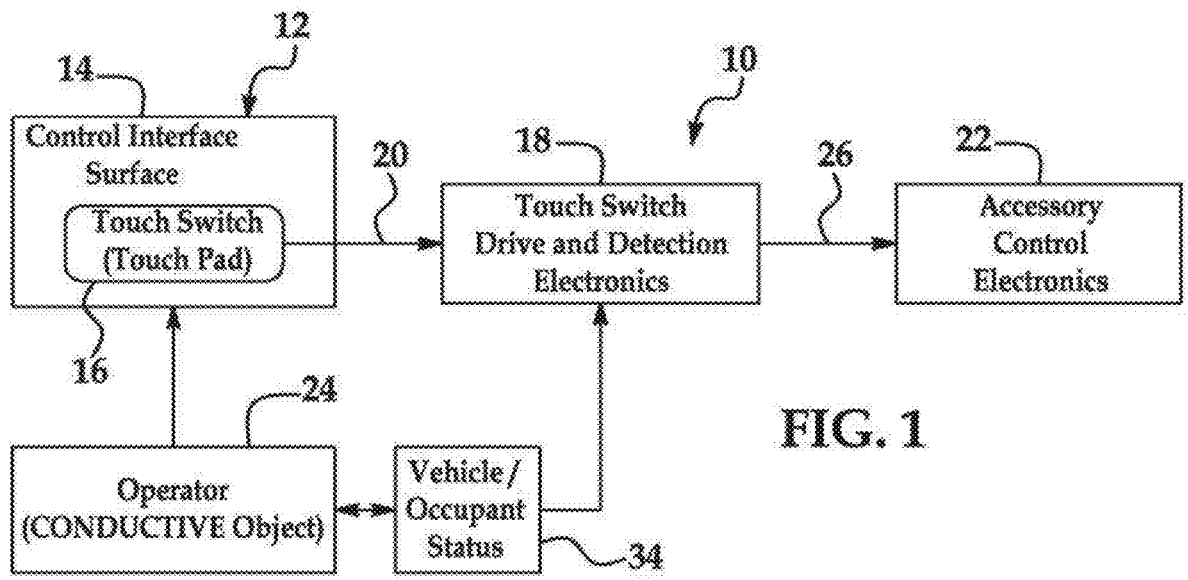
FIG. 1 illustrates a block diagram of a system having a user interface that may be used to control a vehicle accessory in accordance with an embodiment of the present disclosure.

As those of ordinary skill in the art will understand, various features illustrated and described with reference to any one of the Figures may be combined with features illustrated in one or more other Figures to produce embodiments that are not necessarily explicitly illustrated or described. Likewise, those of ordinary skill in the art will recognize that embodiments illustrated in particular Figures may be used in applications described with respect to embodiments illustrated in other Figures. The combinations of features illustrated provide representative embodiments for representative applications. However, various combinations and modifications of the features consistent with the teachings of this disclosure may be desired for particular applications or implementations.

Touch sensitive user interface devices according to the present disclosure may be used to advantage in a wide variety of applications. In vehicle applications, for example, touch sensitive user interface devices facilitate interaction with more sophisticated vehicles, in addition to various types of personal portable electronics that may be used in and around vehicles. With the increase in available vehicle accessories, options, and general or special purpose vehicle applications, user interfaces according to the present disclosure may be used to provide efficient management of control and display functions while affording designers flexibility in arranging the interface for both ergonomics and aesthetics.

As used herein, a touch sensitive user interface refers to virtually any type of user interface that includes one or more regions used to capture user input associated with proximity to, or contact with, the touch sensitive region. A user interface having touch sensitive regions according to the present disclosure may use solid-state electronic devices to implement one or more detection strategies as generally known to those of ordinary skill in the art. As such, various embodiments may be implemented independent of the particular detection strategy used to capture user input, while other embodiments may be limited to a particular detection strategy. Detection strategies may incorporate various electrical, acoustical, optical, and/or combination strategies to detect user input, which may include gestures detected by contact with, and/or proximity to, a particular touch sensitive region, for example. Representative user input detection strategies may incorporate capacitance (or mutual capacitance), optical beam, infrared, vision/camera, and surface acoustic wave detection strategies, for example. Such strategies often provide superior reliability and reduced overall cost relative to mechanical switches, although mechanical switches may also be incorporated into and/or used in cooperation with a user interface in various embodiments of the present disclosure. In general, solid-state touch sensitive switches according to the present disclosure provide advantages relating to reduced control interface complexity and improved ergonomics, while providing a sealed user interface for use in challenging environments that can be permanently or removably mounted in a vehicle.

Referring now to FIG. 1, a block diagram illustrating one embodiment of a system 10 having a user interface 12 that may be used to control one or more vehicle accessories, personal electronic devices, and/or as an input device for an object tracking system according to the present disclosure is shown. User interface 12 includes a surface 14 constructed from, for example, a rigid, transparent, non-conductive material, such as glass or plastic. User interface 12 includes one or more touch sensitive regions, which are implemented by capacitive touch switches (i.e., touch pads) 16 in this embodiment. However, other strategies may be used to detect user input depending on the particular application and implementation as previously described. Touch switches 16 may be mounted in front of, within, and/or behind control interface surface 14 at respective touch sensitive areas or regions of interface surface 14.

Those of ordinary skill in the art will appreciate that the user does not actually touch the active region or touch switch 16 in most applications because the touch switch is positioned behind or within a protective non-conductive material as previously described. As such, as generally used herein, activating, triggering, contacting, or touching a touch sensitive region, switch, or pad includes contacting the surface of any protective covering or faceplate, or the outermost surface of the interface. In some applications, touch sensitive regions or switches may also be activated or triggered by an object within close proximity of the surface of the protective covering or faceplate without actually contacting the surface. Triggering or activation of a particular switch or region may be determined by an associated signal exceeding a corresponding trigger threshold, or by a rate of change in the signal exceeding a corresponding threshold, for example.

Interface 12 is associated with one or more devices, which may include one or more accessories of a vehicle, personal electronic devices, etc. Interface 12 may be permanently or removably mounted in a vehicle and may be powered by an internal battery, a vehicle battery, and/or an AC power cord depending on the particular application and implementation. As such, interface 12 may communicate with one or more associated devices via a wired and/or wireless connection. In one embodiment, interface 12 includes at least a receiver for receiving information from active tags associated with objects within a predetermined or programmable proximity of user interface device 12. Alternatively, interface 12 may include a transceiver for wirelessly polling and/or communicating information, such as identification information, status information, position/location information, etc. with one or more objects within a designated proximity of user interface device 12 as described in greater detail herein.

A mounting location for interface 12 may be selected for accessibility by one or more vehicle occupants, such as a vehicle operator 24. Operator 24 can trigger (i.e., contact or be in proximity with) touch sensitive region or switches 16 (e.g., "controls", "inputs", "input controls", "touch pads", "touch sensitive areas") to provide input to devices associated with interface 12. Device input may then be processed to control various functions of the corresponding devices, which may include displaying information associated with one or more devices, for example. In the embodiment illustrated, interface surface 14 may also function as a display to communicate status or identification information, for example, associated with one or more of the devices associated with control interface 12. As such, interface surface 14 may also be referred to as a display surface.

System 10 further includes touch switch drive and detection electronics 18. Drive and detection electronics 18 drive touch switches 16 with an electrical charge and detect touch activation of touch switches 16 while touch switches 16 are driven with the electrical charge. Drive and detection electronics 18 can either be collocated with touch switches 16 on control interface surface 14 or separated from user interface 12 by an electrically conductive wire 20 (as shown in FIG. 1). Drive and detection electronics 18 can be integrated into a sealed housing with various other components for increased functionality, particularly for a portable interface 12 in more challenging applications or environments. Drive and detection electronics 18 generate signals indicative of activation of touch switches 16 in response to manipulation or triggering of (for example, contacting or nearly contacting) touch switches 16 by operator 24. While being driven with an electrical charge, touch switch 16 will trigger or activate upon contact with a conductive object, such as a human finger, as a result of touch switch 16 capacitively coupling with the conductive object. Similarly, if sensitive enough, a touch switch 16 may be activated by a conductive object in proximity with touch switch 16 as a result of touch switch 16 capacitively coupling with the object while being driven with an electrical charge, as previously described.

In one embodiment according to the present disclosure, system 10 provides customized and/or restricted access to various functions in response to one or more occupant and/or vehicle status indicators 34. Representative vehicle status indicators may include whether the vehicle is moving or stationary, vehicle speed, doors open/closed, engine running or stopped, parking brake set/released, airbag activated/deactivated, etc. Representative occupant status indicators may include where an occupant is seated, whether a seatbelt is latched, a stored preference selector, etc. In one embodiment, vehicle/occupant status 34 includes occupant position or presence detection using a conductor disposed within a vehicle seat with an electrical signal applied to the conductor to act as a carrier or signature signal that is detected by the user interface during proximity or surface contact to determine which occupant is manipulating the user interface. The user interface may control accessibility to various functions and/or may customize the user interface display and controls based on which occupant is manipulating the user interface. In addition, various other vehicle and/or ambient status information may be used to determine the user interface configuration, display features, and/or available functions, for example.

As also illustrated in FIG. 1, system 10 includes a device interface to communicate input and/or receive output from one or more associated devices. The device interface may be implemented by software and/or hardware using proprietary or standard, wired or wireless communication protocols, for example. The device interface functions to provide suitable signal types and levels to control associated devices and may provide various signal conditioning and circuitry protection functions as well. Similarly, the device interface may condition or format incoming signals for use by user interface 12. In one embodiment, a device interface is implemented by accessory control electronics 22. Accessory control electronics 22 are operable to control the functions of the accessories associated with user interface 12 in response to activation of one or more touch switches 16. In this embodiment, accessory control electronics 22 receive the touch activation signals from drive and detection electronics 18 over an electrically conductive wire 26. In turn, accessory control electronics 22 control the functions of the accessories associated with user interface 12 in response to activation of one or more touch switches 16. In another embodiment, the device interface communicates with associated devices wirelessly using a proprietary or standard communication strategy or protocol, such as Bluetooth, for example. Other embodiments may include both wired and wireless communication for control, data input, or information display relative to an associated accessory or other device.

Referring now to FIGS. 2a through 2f, with continual reference to FIG. 1, representative mounting configurations for capacitive touch switches 16 to user interface surface 14 in accordance with embodiments of the present disclosure are shown. FIGS. 2a through 2f illustrate a partial user interface 12 with corresponding touch switches 16. Of course, the actual number and configuration of touch switches 16 will depend on the requirements of the particular application. Depending on size and strength requirements of user interface 12, surface 14 is typically between 0.100 to 0.250 inches in thickness and is made of a material such as glass or plastic.

Figure 2A:
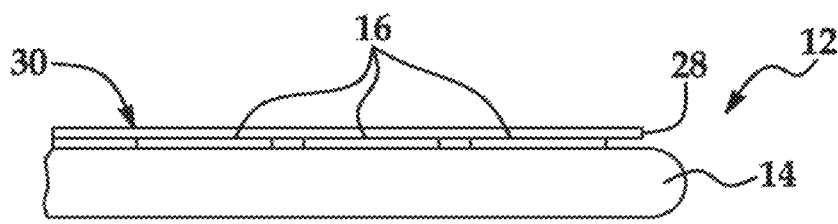
FIGS. 2a-2f illustrate configurations for mounting capacitive touch switches to the surface of a touch sensitive user interface in accordance with embodiments of the present disclosure.

In the mounting configuration of FIG. 2a, touch switches 16 are located between the external side of surface 14 and a non-conductive exterior layer 28. Layer 28 is placed as a protective shield to prevent direct operator contact with touch switches 16. Layer 28 may also be implemented by a substrate upon which touch switches 16 are initially constructed. For embodiments where layer 28 is a substrate for construction of touch switches 16, layer 28 may be made of polycarbonate, acrylic, or polyester, for example. In any case, operator contact occurs on outer surface 30 of layer 28. The thickness of layer 28 is typically selected based on the performance requirements of a particular application. Representative applications may include a layer thickness of between about 0.005 inches and about 0.015 inches. For most applications, signal strength increases as a conductive object approaches touch switches 16, with the maximum signal strength corresponding to contact with layer 28. As such, a thinner layer 28 may be used to advantage to increase maximum signal strength when covering touch switches 16 that may otherwise exhibit low sensitivity as a thinner layer 28 may increase capacitive coupling by facilitating closer proximity of the conductive object. Although it is not required that layer 28 be kept thin, this thickness presents a significant disadvantage in touch technologies different from that defined herein.

Figure 2B:
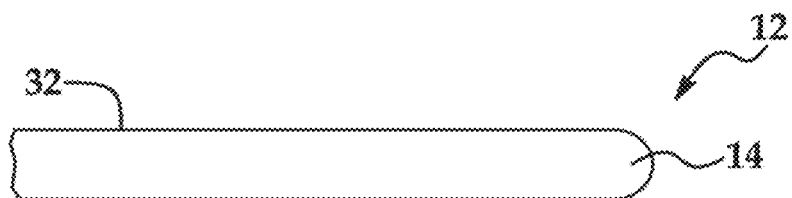

The mounting configuration represented in FIG. 2b provides a simple approach for placing touch switches 16 onto user interface surface 14. In this configuration, touch switches 16 are placed directly onto the backside (i.e., internal side) of user interface surface 14 without an additional protective layer between touch switches 16 and surface 14. This is a cost effective approach where touch switches 16 do not require protection on the back side of user interface surface 14. Placing touch switches 16 onto the back side of interface surface 14 clears external side 32 of user interface surface 14 (i.e., the side of user interface surface 14 presented to operator 24) from touch switch components and protective films. A designer is then free to transform external side 32 of user interface surface 14 to create whatever appearance is desired.

Figure 2C:
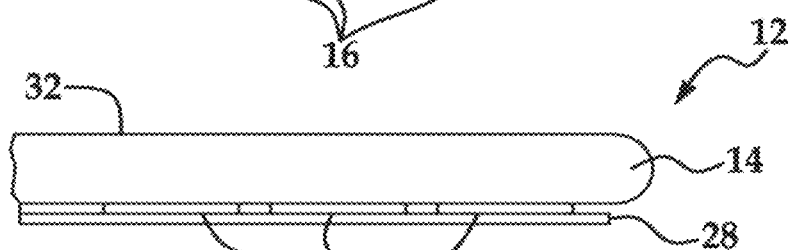

In the mounting configuration of FIG. 2c, touch switches 16 are located between the internal side of interface surface 14 and a non-conductive exterior layer 28. This construction is similar to that of FIG. 2a. In this embodiment, layer 28 forms the substrate onto which touch switches 16 are initially constructed. Once assembled, layer 28 can also function as a protective shield for touch switches 16, though protection may not be necessary as touch switches 16 are located on the backside of interface surface 14. As previously described, placing touch switches 16 onto the internal side of surface 14 clears external side 32 of surface 14 from touch switch components and protective films. This provides greater flexibility in selection of finishes for external side 32.

Figure 2D:
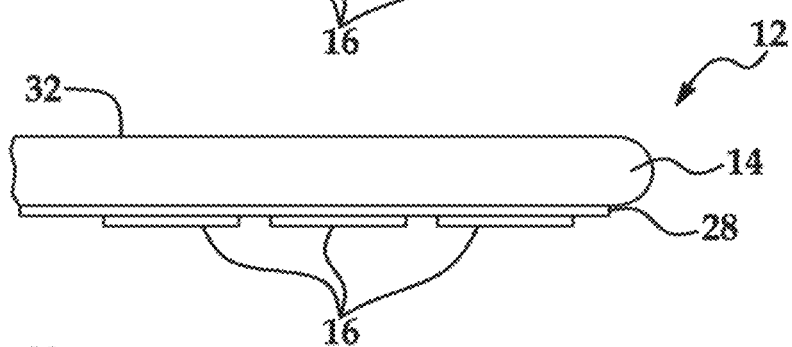

In the mounting configuration of FIG. 2d, a non-conductive layer 28 is placed on the internal side of interface surface 14 and touch switches 16 are placed on layer 28. As a result, layer 28 is disposed between the internal side of surface 14 and touch switches 16. In this configuration, layer 28 with touch switches 16 thereon can be bonded to the internal side of surface 14 without exerting bonding stress on touch switches 16.

Figure 2E:
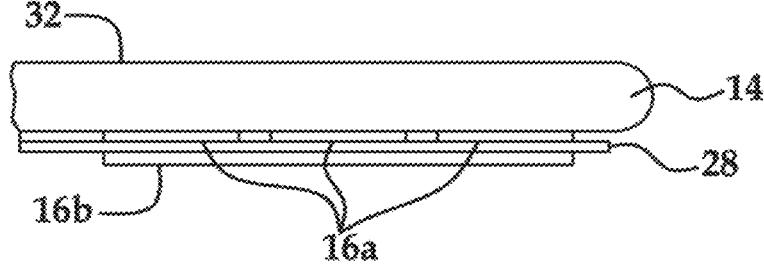

In the mounting configuration of FIG. 2e, two separate touch switch layers 16a, 16b are placed on respective sides of a non-conductive layer 28 with the first touch switch layer 16a being placed on the internal side of interface surface 14. This configuration is desirable when two layers of touch switches 16 are desired to meet the design requirements of user interface 12. A cost savings can be realized either in the manufacturing of touch switches 16 or by simplifying assembly of interface 12 when this configuration is selected.

Figure 2F:
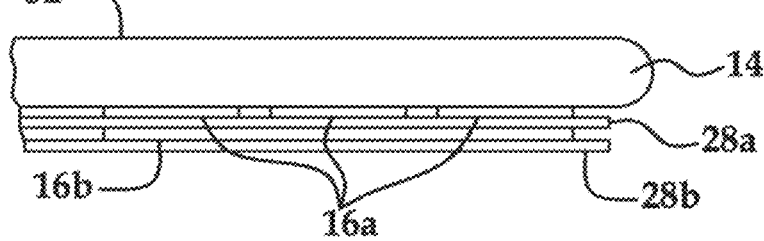

FIG. 2f illustrates another representative mounting configuration with alternating touch switch layers and non-conductive layers. First and second touch switch layers 16a, 16b are placed on respective sides of a first non-conductive layer 28a with touch switch layer 16a disposed on the internal side of surface 14. A second non-conductive layer 28b is placed over second touch switch layer 16b. Each layer of touch switches 16a, 16b is initially constructed as a single layer on separate substrates 28a, 28b, respectively. Once constructed, the individual substrates 28a, 28b are then stacked to create multi-layer touch switches 16.

Through rearrangement, substitution, or addition of the user interface components shown in FIG. 2a though 2f, further variations of control interface 12 can be realized. For example, the configuration in FIG. 2f can be characterized as having two single layer substrates 28a, 28b. However, this configuration can also be characterized as having one double layer substrate 28a, as illustrated in FIG. 2e, in addition to an exterior substrate layer 28b functioning as a protective layer. Likewise, the configuration in FIG. 2e can be constructed with more than two touch switch layers 16a, 16b. The touch switch layers 16a, 16b in FIG. 2e can be applied to external side 32 of surface 14 to create multiple layer touch switches on external side 32 similar to the configuration in FIG. 2a.

Figure 3:
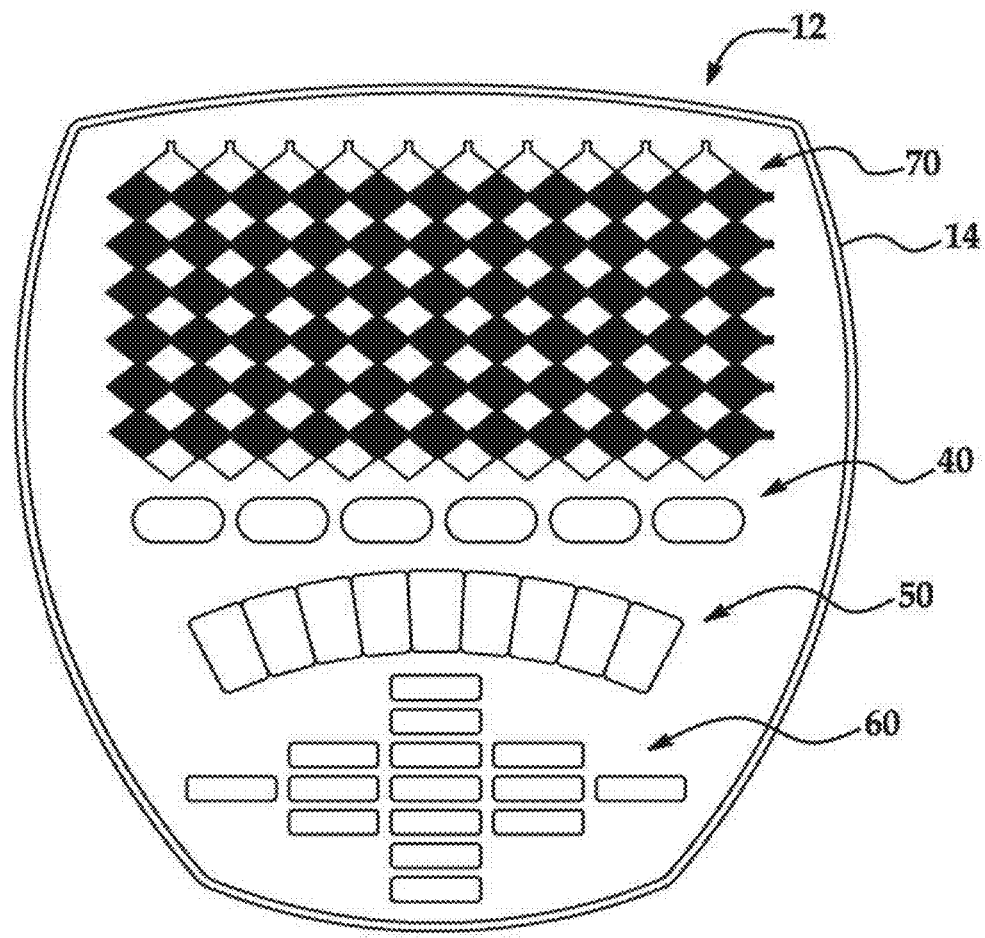
FIG. 3 illustrates a user interface having touch sensitive switches arranged in a representative configuration in accordance with an embodiment of the present disclosure.

Referring now to FIG. 3, with continual reference to FIG. 1, a user interface 12 having touch switches 16 arranged in a representative configuration in accordance with an embodiment of the present disclosure is shown. In this embodiment, user interface surface 14 functions as an accessory control area permanently or removably mounted within a vehicle center stack console. Touch switches 16 are positioned across control interface surface 14 to provide operator 24 with controls for various vehicle accessories, such as audio, climate control, and navigation, for example. Touch switches 16 are arranged in separate touch switch regions or groups 40, 50, 60, and 70. As described in greater detail below with reference to FIGS. 4, 5, 6, and 7, touch switches 16 of each touch switch group are arranged in certain patterns and arrays to provide desired functionality for this representative application. Of course, the representative configuration is used only for ease of illustration and explanation and those of ordinary skill in the art will recognize that the touch sensitive switches 16 may be arranged in virtually any conceivable configuration to provide desired functionality for a particular application or implementation.

In the representative configuration illustrated in FIG. 3, touch switches 16 are shared among accessories to reduce the overall number of switches to control all available accessory functions. In this embodiment, surface 14 is optically transparent for viewing of a display device positioned behind surface 14. Graphical images generated by the display device can then be seen through surface 14 to assist operator 24 in locating positions of desired touch switches 16, and/or to display accessory functions assigned to each touch switch 16, for example. In this regard, surface 14 may also be referred to as a display surface. As described in greater detail below, refractive index matching considerations may be used to reduce user visibility of various components of touch switches 16 through surface 14.

Figure 4:
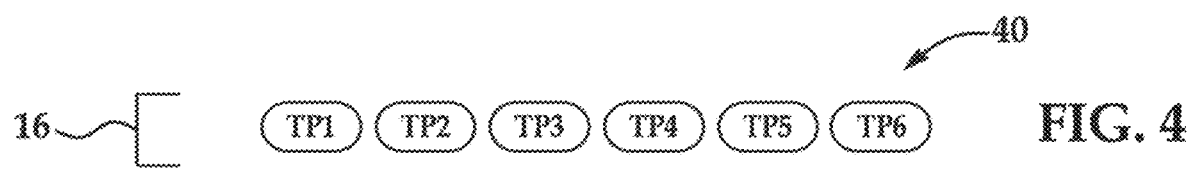
FIG. 4 illustrates a group of touch sensitive switches of the user interface shown in FIG. 3 arranged in a representative configuration for entering single input commands.

Referring now to FIG. 4, the arrangement of touch switches 16 of touch switch group 40 of user interface 12 shown in FIG. 3 will be described in greater detail. As previously described, in this representative embodiment, touch switches 16 of touch switch group 40 are arranged in a configuration for entering single input commands. For example, touch switches 16 of touch switch group 40 may function as accessory selection switches. In the illustrated example, touch switch group 40 includes six touch switches 16. Of course, the number and/or configuration of touch switches 16 may vary depending upon the particular application and implementation. Each touch switch 16 can be assigned a primary device or accessory, such as audio, climate control, navigation, communication, or vehicle status reporting, for example. Depending upon the particular application, each touch switch 16 may also be associated with more than one device. One advantage of using touch sensitive switches according to the present disclosure is the ability to program user interface 12 to assign one or more functions to touch switches 16 and provide a corresponding visual display to improve usability of the interface for multiple devices. Once a particular device or accessory is selected by activation of a corresponding touch switch 16, the functionality of one or more of the touch switches within group 40 may switch to a secondary function associated with the selected device or accessory, for example.

Figure 5:
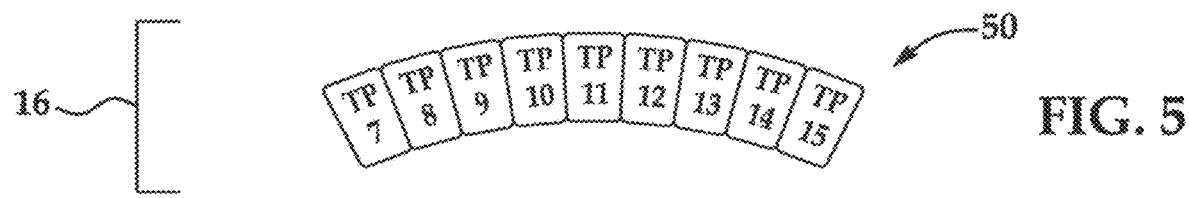
FIG. 5 illustrates another group of touch sensitive switches of the user interface shown in FIG. 3 arranged in a representative configuration for entering multiple sequential input commands.
Figure 6:
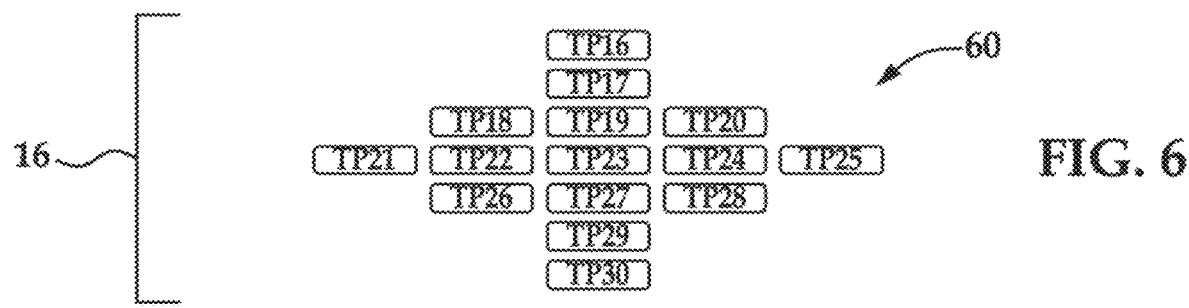
FIG. 6 illustrates another group of touch sensitive switches of the vehicle accessory control interface shown in FIG. 3 arranged in a representative configuration for entering single input commands and multiple sequential input commands.

FIG. 5 illustrates touch switches 16 of touch switch group 50 of user interface 12 (shown in FIG. 3) in greater detail. Touch switches 16 of group 50 are arranged in a configuration particularly suited for entering multiple sequential input commands. As such, touch switches 16 of touch switch group 50 are arranged close together in an arcuate fashion. This configuration may be used to imitate or simulate an analog input, such as an input associated with a slider control, for example. Of course, switches 16 may be arranged in other configurations to provide simulated analog input, such as in a circle to simulate a rotary dial, or in a horizontal, vertical, and/or diagonal linear fashion as illustrated in FIGS. 4 and 6, for example. Simulated analog input provided by these configurations or similar configurations may be used for various functions in a number of applications, such as for adjusting climate control temperature settings; adjusting volume, tone, or balance settings for a vehicle mounted or personal portable audio accessory; or as a scrubber bar for browsing information of a navigation accessory, for example.

In the example of FIG. 5, touch switch group 50 includes nine (9) touch switches 16. Because of their close proximity to one another, two or more adjacent touch switches 16 may be triggered or activated simultaneously when operator 24 is within close proximity to and/or contacts interface surface 14. Switch detection electronics 18 can process signal data from each of these nine inputs (i.e., touch switches 16) individually and/or as groups or subgroups to generate various control signals for associated accessories. Adjacent touch switches 16 that are simultaneously activated can then be interpreted as input points falling between adjacent touch switches 16. For example, if inputs are processed both separately for each individual switch, and in combination of two-switch pairs for adjacent switches, seventeen different inputs may be detected. Alternatively, or in combination, activation of switches within group 50 can be interpreted as a single group or multiple groups by mapping switch inputs to a common command, or ignoring activation of any number of the touch switch signals, for example, to emulate a smaller number of touch switches 16.

Referring now to FIG. 6, switch group 60 of interface 12 (FIG. 3) is shown in greater detail. Touch switches 16 of group 60 are arranged in a configuration suitable both for entering single input commands and multiple sequential input commands. Touch switches 16 of group 60 are arranged in respective arrays of single point touch switches 16. Each touch switch 16 can be activated to generate a specific input command similar to that of a mechanical switch. Additionally, touch switches 16 are intentionally arranged in respective arrays to accommodate touch input expressed in a gestural form. Activation of any one of touch switches 16 (or adjacent pairs of switches in some applications) can prompt recognition of a single point input command. Sequential activation of more than one touch switch 16 can be interpreted as an input gesture rather than a series of single point input commands.

One example of an application for arrays of touch switches 16 configured as a touch switch group 60 is for use in operating the climate control system of a vehicle. In this representative application, tapping touch switch (touch pad) TP21 activates a climate adjustment mode for the driver while tapping touch pad TP25 activates a climate adjustment mode for the passenger. After an occupant is selected, sequential activation of touch pads TP21-TP22-TP23-TP24-TP25 represents a command to increase fan speed for the selected occupant. Conversely, sequential activation of these touch pads 16 in the reverse order represents a command to reduce fan speed. At the same time, a sequential activation of touch pads TP16-TP17-TP19-TP23-TP27-TP29-TP30 represents the command to decrease temperature for the selected occupant, while touch pad activation in the reverse order represents a command to increase temperature.

Not all of touch switches 16 of a touch switch group need to be activated for the gestural command to be recognized. Sequential activation of two or more touch switches 16 may be recognized as a gestural input or command. Appropriate position of touch switches 16 facilitates interpolation of positions between or among proximate touch pads when desired. Interpolated positions may be used to simulate an analog input, such as a potentiometer input, for example. This feature is useful when trying to create precise set-point controls, such as those used for temperature or volume adjustment, for example.

Figure 7:
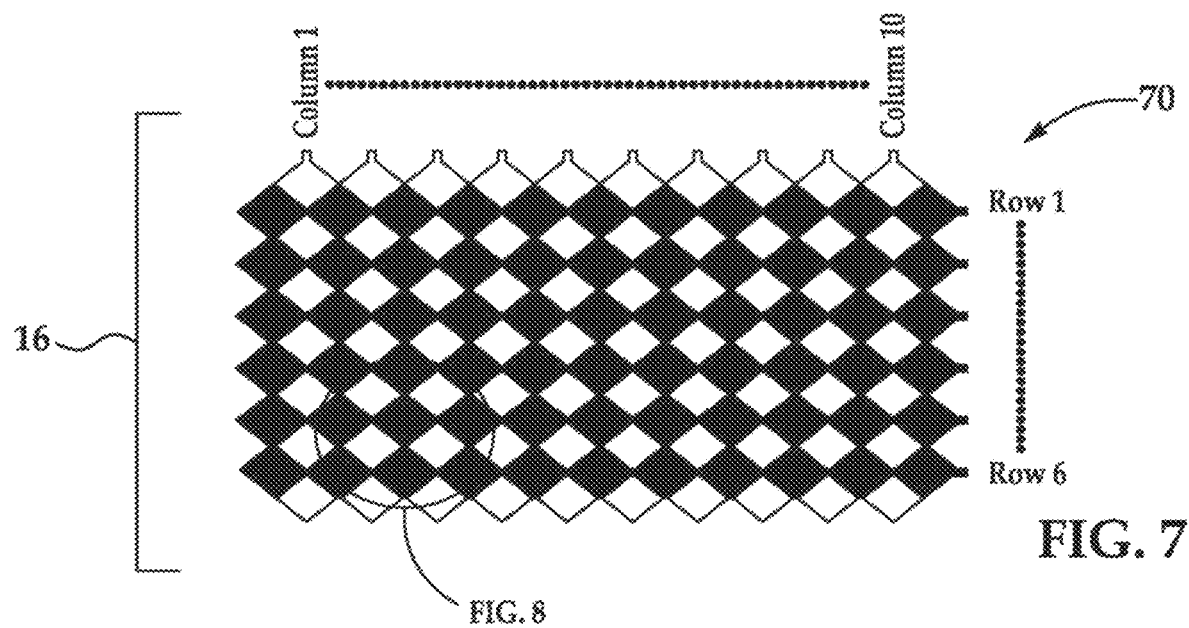
FIG. 7 illustrates another group of touch sensitive switches of the user interface shown in FIG. 3 arranged in a representative configuration for entering single input and multiple sequential input commands using a two-dimensional input array.
Figure 8:
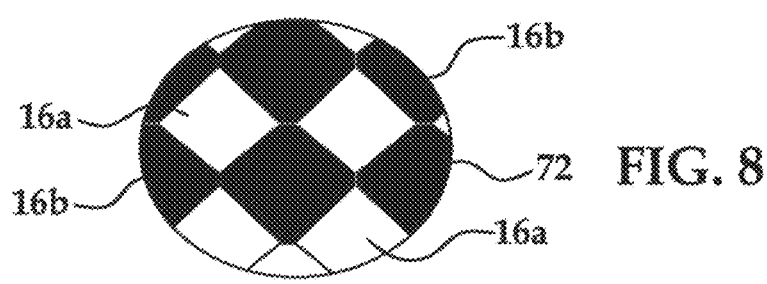
FIG. 8 illustrates a more detailed view of a portion of the two-dimensional input array shown in FIG. 7.

Referring now to FIG. 7, touch switches 16 of switch group 70 of user interface 12 (FIG. 3) are shown in greater detail. The configuration of switches 16 within group 70 facilitates both single input and multiple sequential input commands using a two-dimensional input array. As such, touch switches 16 are arranged in touch switch columns 16*a* and touch switch rows 16*b*. Touch switch columns 16*a* and rows 16*b* are separated from one another by a substrate layer 28 as illustrated and described with reference to FIGS. 2*e* and 2*f*. The individual touch switch columns 16*a* and rows 16*b* (see FIG. 8) are formed by sequentially connected touch switches 16. Touch switches 16 are positioned to reduce signal cross talk between switches of column 16*a* and row 16*b* by managing the size of any overlap area 72 common to both switch columns 16*a* and rows 16*b*. In addition, touch switches 16 may be appropriately sized and positioned to define areas void of touch pad material on both sides of substrate 28 to reduce or eliminate overlap 72 and resulting cross talk between touch switch layers 16*a*, 16*b*.

During use, operator 24 moves within proximity of, or contacts surface 14 capacitively coupling with one or more switches 16 within column 16*a* and/or row 16*b*. Touch switch columns 16*a* and rows 16*b* may be positioned so that the operator contact area will include both a touch pad column 16*a* and row 16*b*. The activated location is determined by monitoring the signals generated by each touch switch column 16*a* and row 16*b*. When contact is not directly over a touch switch column 16*a* or row 16*b*, the activated position may be interpolated by reading the input signal from the two closest touch switch columns 16*a* and rows 16*b* as determined by the corresponding signal strengths corresponding to surrounding switches. As all touch switch columns 16*a* and rows 16*b* sense independently, it is possible to identify a multitude of contact areas within array 70. As such, array 70 is capable of simultaneous multi-point recognition. One or more touch locations may then be identified by the intersecting points of high signal strength, for example. Multi-point or multi-touch recognition may be used to generate various types of input, including but not limited to gestural input, for example.

Because of their close proximity to one another, adjacent touch switch columns 16*a* and rows 16*b* can produce an input signal when operator 24 makes contact between them on control interface surface 14. Adjacent touch switch columns 16*a* and rows 16*b* experiencing simultaneous input signal can then be interpreted as input points that fall between adjacent touch switch columns 16*a* or rows 16*b*.

Technologies such as resistive touch screens are established as position sensing touch panels. However, resistive touch screens do not completely address the problems associated with mechanical switches. Resistive touch screens are placed on the external side of a control interface surface where they are continuously subjected to activation pressures, lay flat, and have a simple footprint such as a square or a rectangle. Their application is limited both by their geometry and durability. Capacitive touch sensors (i.e., capacitive touch switches) are a better solution for applications that can benefit from interface surfaces with complex geometries. Likewise placement of capacitive touch sensors behind or within the control interface surface completely hides the electrical components to produce a clean and natural appearing surface.

Figure 9:
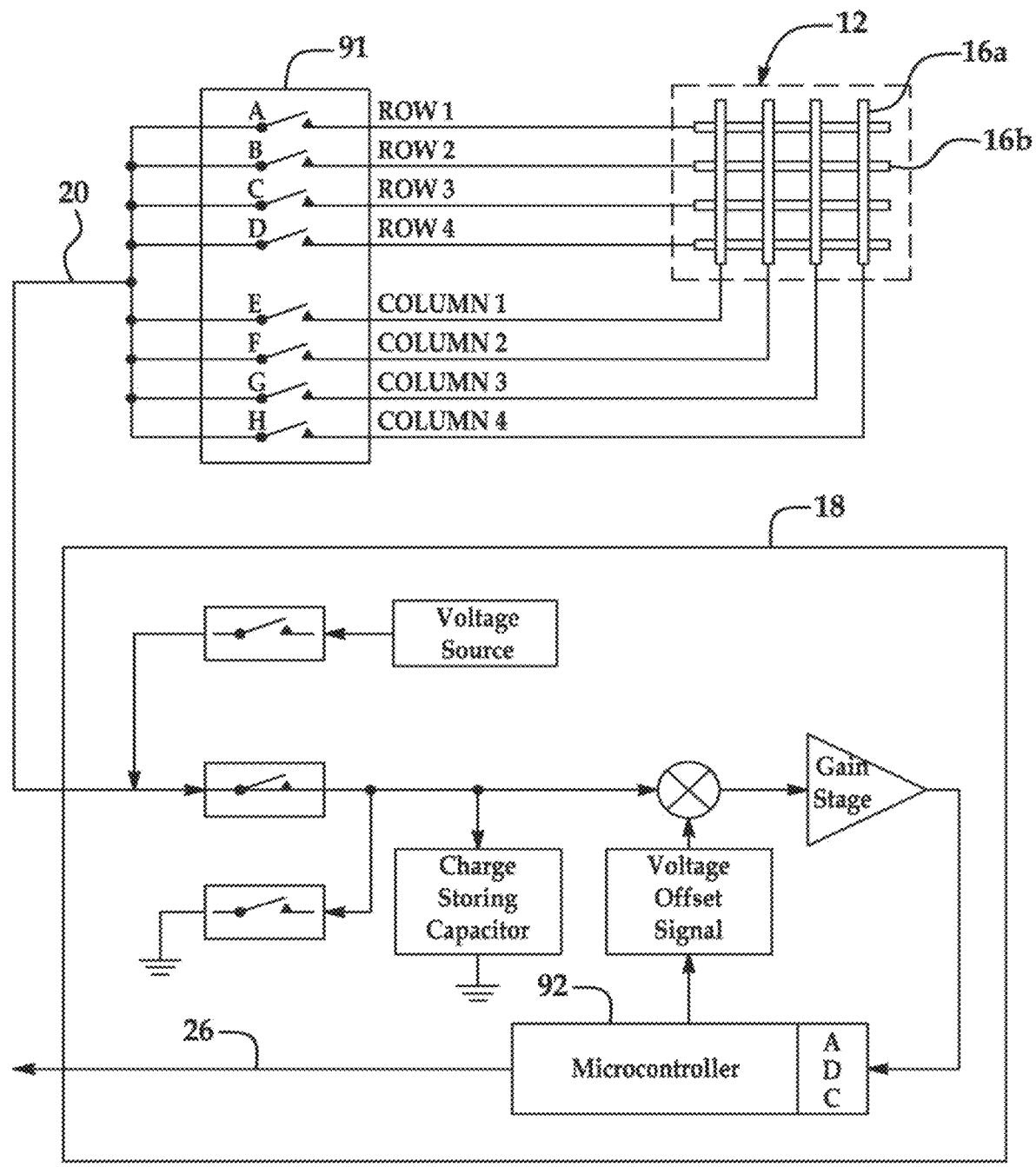
FIG. 9 is a block diagram illustrating an electrical circuit for capacitive touch electronics of a user interface for reading multiple touch switch inputs into a one input touch switch drive and detection circuit in accordance with an embodiment of the present disclosure.

Referring now to FIG. 9, with continual reference to FIG. 1, an electrical circuit diagram of the capacitive touch electronics of control interface 12 for reading multiple touch switch inputs 16 into a one input touch switch drive and detection circuit 18 in accordance with an embodiment of the present disclosure is shown. This electrical circuit diagram illustrates exemplary electronic circuitry for operating a multitude of capacitive touch sensors 16 arranged as an array. The outlined circuitry block 18 represents a single input drive and detection circuit for measuring the capacitive signal developed on a touch sensor 16.

In this example, switches A through H of a multiplexor 91 provide solid state switching between touch sensors 16 and drive and detection electronics in a multiplexed fashion which permits one drive and detection circuit 18 to sense input on eight independent touch sensors 16. When solid state switch A of multiplexor 91 is closed, drive and detection circuitry 18 becomes electrically connected to touch sensor 16*b* that is connected to ROW 1. Drive and detection circuitry 18 turns each solid state switch 16 on in progression to read each of the four touch switch columns 16*a* and rows 16*b* independently. This successive multiplexed reading of touch inputs has the benefit of reducing the number of inputs and components required by drive and detection circuit 18. In one embodiment drive and detection circuitry 18 uses a microprocessor 92 to control the multiplexing and sensor reading tasks. However, drive and detection circuitry 18 could employ an ASIC or other such highly integrated circuit.

In one embodiment, position interpolation is performed by measuring capacitive signal strength developed on adjacent touch switches 16, columns 16*a*, and rows 16*b* and then interpolating actual touch position by comparing the signal strengths on two adjacent touch switch columns 16*a* or rows 16*b*. This effectively increases resolution without additional hardware. The output response from drive and detection circuitry 18 can be individual signals for each touch switch 16, and/or a serial data stream. The output response can represent or identify an activated touch switch 16 and/or provide an indication of signal strength for each touch switch 16 to be processed further by accessory control electronics 22.

In one embodiment, the input signal acquired by drive and detection circuitry 18 when reading a touch switch 16 is a numerical value representing the amount of electrical charge developed on the touch switch as a result of capacitive coupling to its surroundings. For a single switch input, the measured or detected charge value can be compared directly to a predetermined or adaptable threshold value to determine whether touch switch 16 has been activated. Alternatively, or in combination, a delta or change in the measured charge value, and/or a rate of change in the measured charge value is/are compared to one or more corresponding thresholds to determine switch activation. Those of ordinary skill in the art may recognize various other strategies for detecting activation or triggering of a touch sensitive switch.

Gestural command inputs can be used to communicate special instructions by the operator to the accessory control. For example a touch gesture tracing the outline of a circle or partial arc on the touch switch array may represent a command to rotate or turn a virtual control knob that is represented on a display behind control interface surface 14. Tracing an X on the touch switch array could signify the canceling of a function while tracing a check mark might communicate acceptance or completion of accessory adjustments. A gestural input may be detected by drive and detection circuitry 18 by detecting a sequence or series of switch activations across a group or array of touch switches 16. For example, switch activations of designated switches detected by drive and detection circuitry 18 over a predetermined time period can be decoded as a gestural input command.

As previously described, one advantage of using capacitive touch sensors 16 in a user interface 12 is the ability to detect an object within some proximity of touch switch 16 before the object actually makes contact with surface 14. This capability may be used in various applications to provide a "wakeup" response for a "sleeping" user interface 12. For example, user interface 12 can enter a sleep mode after a period of inactivity where any corresponding lights or displays are darkened or inactive until operator 24 comes within some range or proximity of surface 14. When an approaching user is detected, interface 12 "wakes" and acknowledges operator 24 by activating the display, lighting the control interface panel, sending an audible wake-up confirmation, vibrating and/or providing other such feedback to operator 24.

Proximity detection strategies may be used separately or in various combinations to provide proximity detection for touch sensitive interfaces according to the present disclosure. Four representative strategies for use with capacitive touch switches are described explicitly herein and may be implemented in software, hardware, or a combination of software and hardware depending on the particular application and implementation. However, those of ordinary skill in the art may recognize various other strategies for use with capacitive touch switches and/or other touch sensitive detection strategies previously described. In a first representative strategy, the activation or triggering threshold used by drive and detection electronics 18 to determine activation of a touch switch 16 is adjusted to increase sensitivity. When a conductive object, such as user 24, moves toward switch 16, the signal strength increases and detection occurs when a corresponding threshold is crossed, which may be based on signal strength or rate of change, for example, as previously described.

In a second representative strategy, proximity detection signal values are read from two or more touch switches 16 and processed by drive and detection electronics 18. Various signal processing strategies may be used to combine the signal values to control and enhance detection sensitivity. In one embodiment, signal values are combined by summing. The collective signal value has a greater magnitude (and greater magnitude of change) in response to an approaching or proximate object such that the detection threshold is crossed prior to contact with surface 14. Other, more sophisticated mathematical/statistical techniques may be used to filter and/or process the raw data/signals provided by a group or array of sensors to detect a corresponding proximate object.

In a third representative strategy, two or more touch switches 16 are temporarily or persistently connected together to create a touch switch 16 having a larger surface area. This may be accomplished by energizing two or more touch switches 16 in multiplexor 91 to electrically join individual touch switches 16 together. By increasing switch surface area, the signal input to drive and detection electronics 18 will exhibit a correspondingly stronger response to approaching or proximal objects. This effectively makes the touch switch surface more sensitive.

Proximity detection is provided using a fourth representative strategy where user interface 12 has dedicated touch sensor switches, areas, or regions having higher sensitivity than other touch switches to detect approaching or proximal objects. Increased sensitivity may be provided using one or more of the previously described strategies and/or may be inherent in the construction of the switches or areas designed for proximity detection. These touch sensor switches, areas, or regions can be strategically positioned around the periphery and/or within user interface 12 independent of the position of surface 14 or other touch sensitive switches. Alternatively, or in combination, these switches may be placed adjacent to, or intermixed among, touch switches 16. Likewise, the touch sensor switches, areas, or regions used for proximity detection can be constructed on separate conductive layers or substrates relative to other touch sensitive switches.

Any combination of the four noted proximity detection methods can be implemented to achieve the desired characteristics of proximity detection to an approaching or proximal object. Proximity detection can be implemented across the touch interface surface or selectively controlled by sensing the signal(s) provided by one or more touch switches 16. Likewise, proximity detection may utilize a different detection strategy than used for touch sensitive detection/activation of other switches. For example, infrared or photo detection strategies may be used for proximity detection with capacitive coupling used to detect activation of other touch sensitive switches.

Proximity detection may be used to detect three-dimensional gestural input. For example, variations in touch switch signal strength, touch switch location, and/or signal time tracking may be used to provide a three-dimensional gesturing palette via surface 14. Recognition of hand gesturing above surface 14 may be performed by analyzing or processing information related to depth or distance as represented by the signal strength corresponding to various touch switches 16. In this way, proximity detection is suited for advanced gesture recognition by processing not only multipoint and sequential point gestures in the time domain, but also adding a third component representing depth or distance that can be used to differentiate among otherwise similar gestures.

Figure 10:
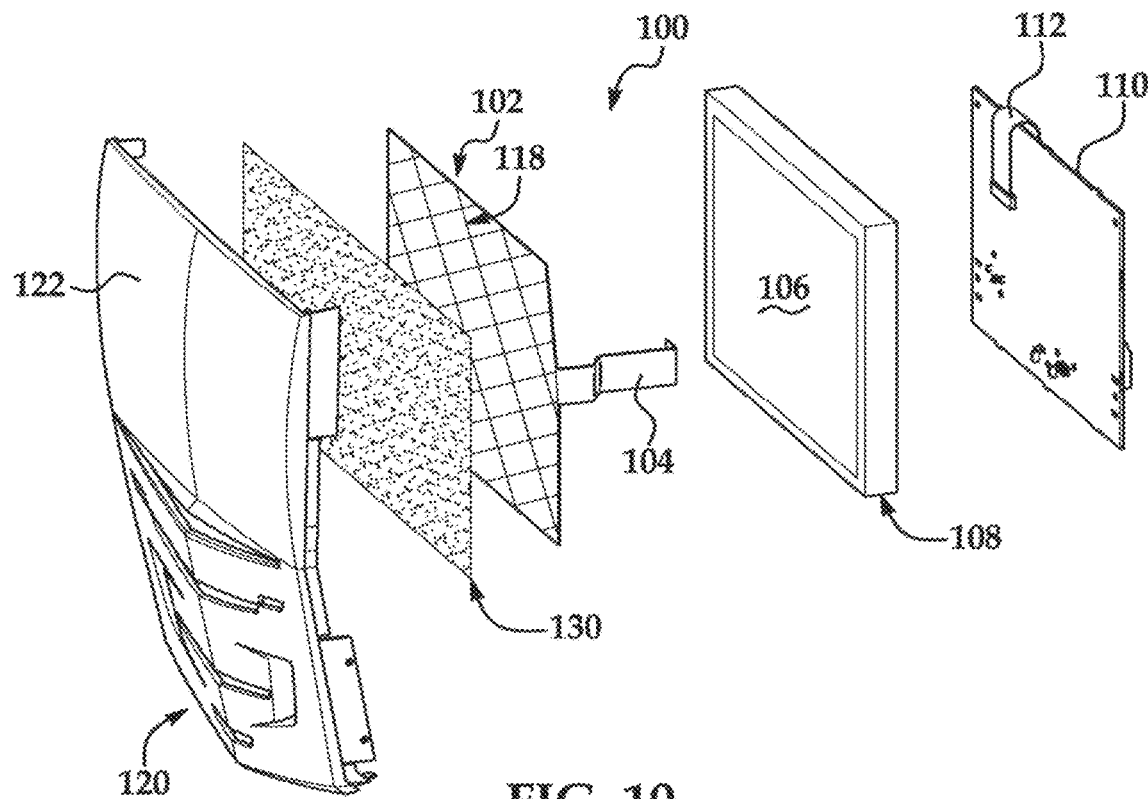
FIG. 10 is an assembly drawing illustrating a representative user interface incorporating an adhesive selected to reduce visibility of touch detection features according to embodiments of the present disclosure.

Referring now to FIG. 10, a simplified assembly drawing illustrates construction and operation of a representative embodiment of a user interface having a display and one or more touch sensitive switches according to the present disclosure. User interface device 100 incorporates a solid-state touch sensitive panel or pad 102 having an associated electrical connector 104. In one embodiment, panel 102 is implemented by a capacitive touch sensor pad, such as the SmartTouch™ pad available from the assignee of the present application. Sensor panel 102 may be constructed as previously described. In the illustrated embodiment, sensor panel 102 is constructed with a generally transparent substrate and an array of conductors 118 (not shown to scale) such that illuminated portions of screen 106 of display 108 are visible to a user. In one embodiment, sensor panel 102 is constructed using indium tin oxide (ITO) with touch sensitive switches or regions positioned or programmed as desired for particular applications. Display 108 may be implemented by a rigid or semi-rigid flat panel or contoured display, such as an LED or LCD display. Alternatively, display 108 may be implemented by a flexible display, such as an organic light emitting diode (OLED) or similar display, for example.

As also shown in FIG. 10, device 100 includes one or more electronics cards or boards 110 with associated connectors as represented by connector 112. Electronics 110 may include various drive and detection electronics for sensor panel/layer 102 as previously described. In one embodiment, electronics 110 include a microprocessor as well as computer readable storage media implemented by memory and/or persistent storage having stored data representing program code or instructions executable by the microprocessor to provide touch sensitive user interface functions for an associated vehicle accessory, personal electronics, tracking system, and the like as described herein. Electronics 110 may also include various hardware, firmware, and/or software to communicate with: a wired or wireless remote input device, such as a mouse, track ball, stylus, or touch pad; a cellular, satellite, or radio frequency (RF) network; and/or active/passive identification tags associated with tracked cargo or objects as described in greater detail herein, particularly with respect to FIGS. 12-14. Electronics board 110 may be connected to display 108 and sensor panel 102 to control information presented to the user via display 108 and process input detected by sensor panel or touch pad 102 as previously described.

User interface device 100 may also include a front cover or faceplate 120 having a generally transparent non-conductive active surface area 122, which may be made of glass or plastic, for example. Surface area 122 may incorporate tinted or smoked material to reduce reflections or glare and enhance visibility of display screen 106. Alternatively, or in combination, one or more anti-reflective (AR) layers or coatings may be applied to either side of area 122 to provide desired aesthetics and/or enhance visibility or readability of display screen 106. In one embodiment, a cloaking or masking layer 130 may be used to reduce visibility of features 118 of sensor panel 102 to a user.

Figure 11A:
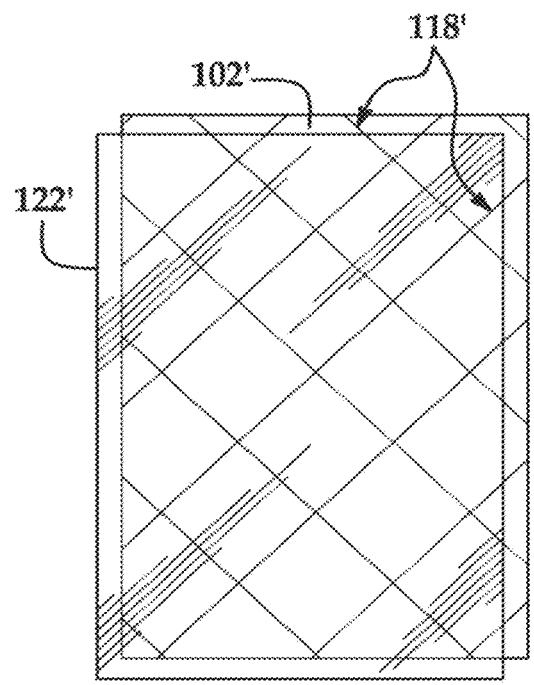
FIG. 11a illustrates a user interface incorporating a touch pad with component features visible through the faceplate to a user.
Figure 11B:
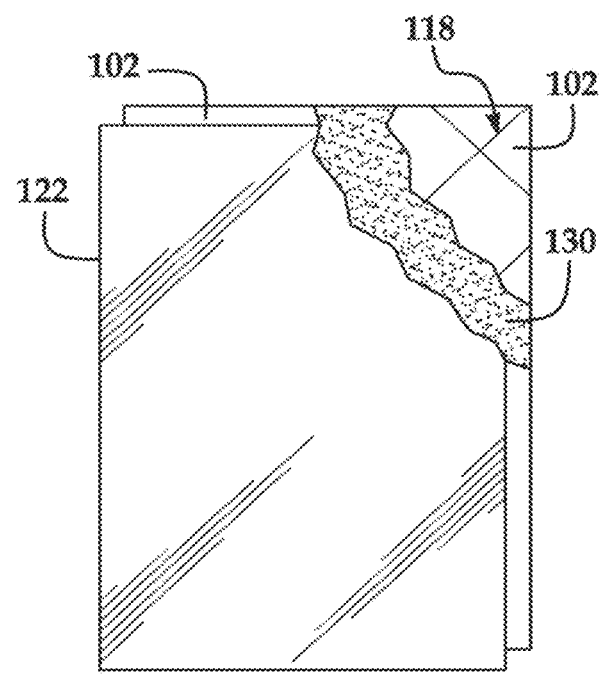
FIG. 11b illustrates a user interface incorporating a touch pad having reduced visibility of component features associated with an adhesive selected to improve refractive index matching.

Light passing from display screen 106 may be partially reflected by one or more layers of sensor panel 102 and area 122 of face plate 120 resulting in feature pattern 118 being visible to a user. Conventional strategies for reducing visibility of features 118 include adding filters and reflector sheets to mask this visual effect. As illustrated in FIG. 11A, a user interface without a masking layer 130 has features 118' of a sensor panel 102' visible to a user through transparent surface 122' of the faceplate. Although suitable for some applications, visibility of features 118' may not be particularly aesthetically pleasing and may reduce the readability of display screen 106 through surface 122'. In the embodiment illustrated in FIG. 11B, layer 130 reduces or eliminates visibility of features 118 through surface 122. According to the present disclosure, appropriate selection of material, thickness, and controlled application of layer 130 may operate to reduce or eliminate internal reflections that otherwise reveal features 118 of sensor panel 102 to the user. This may be performed by selecting a material that reduces or eliminates the refractive index differences between area 122, panel 102, and screen 106, for example, as large differences in refractive indices typically generate more internal reflections. In various embodiments layer 130 is implemented by an adhesive spray, liquid, or filter that is generally transparent and colorless, such as DP-270, which is commercially available from 3-M Corporation, for example. When implemented by an adhesive spray, layer 130 is applied to panel 102 and/or the back surface of area 122 in a manner that minimizes or eliminates air bubbles or any contaminants between surface 122 and panel 102. Adhesive layer 130 then secures sensor pad 102 to faceplate 120. An additional layer or coating of clear acrylic may be applied to the back side of surface 122 and/or the surface of panel 102 to further reduce visibility of features 118. Screen 108 and electronics 110 are then assembled with a rear cover (not shown) secured to faceplate 120 to form an air tight seal to prevent dust, water, or other environmental contaminants from entering input device 100. This facilitates use of input device 100 in various challenging environments.

As previously described, user interface or input device 100 includes an active surface 122 for entering commands or data via a solid-state touch sensitive switch or array as well as for displaying information to a user via screen 108. For data entry, one or more regions of sensor panel 102 may be configured as a keypad or keyboard with corresponding keys displayed by screen 108, for example. As previously described, although the illustrated embodiment includes a capacitive sensor panel 102, other touch detection strategies may be used in place of, or in combination with, a capacitive sensor panel 102.

As illustrated and described in greater detail with reference to FIGS. 12-14, input device 100 may also interface with one or more remote input devices, such as a track ball, mouse, stylus, keypad, keyboard, etc. via electronics 110. Input device 100 may be sized for portable use and powered by an internal battery (not shown), as well as an external AC and/or DC power source. As such, input device 100 may include one or more data/power interfaces or connectors for charging an internal battery and exchanging data with a local or remote device or network. Input device 100 may be removably mounted in a vehicle as an interface for a logistics management system and/or to control one or more vehicle accessories or electronic devices within a particular range of the vehicle.

Figure 12:
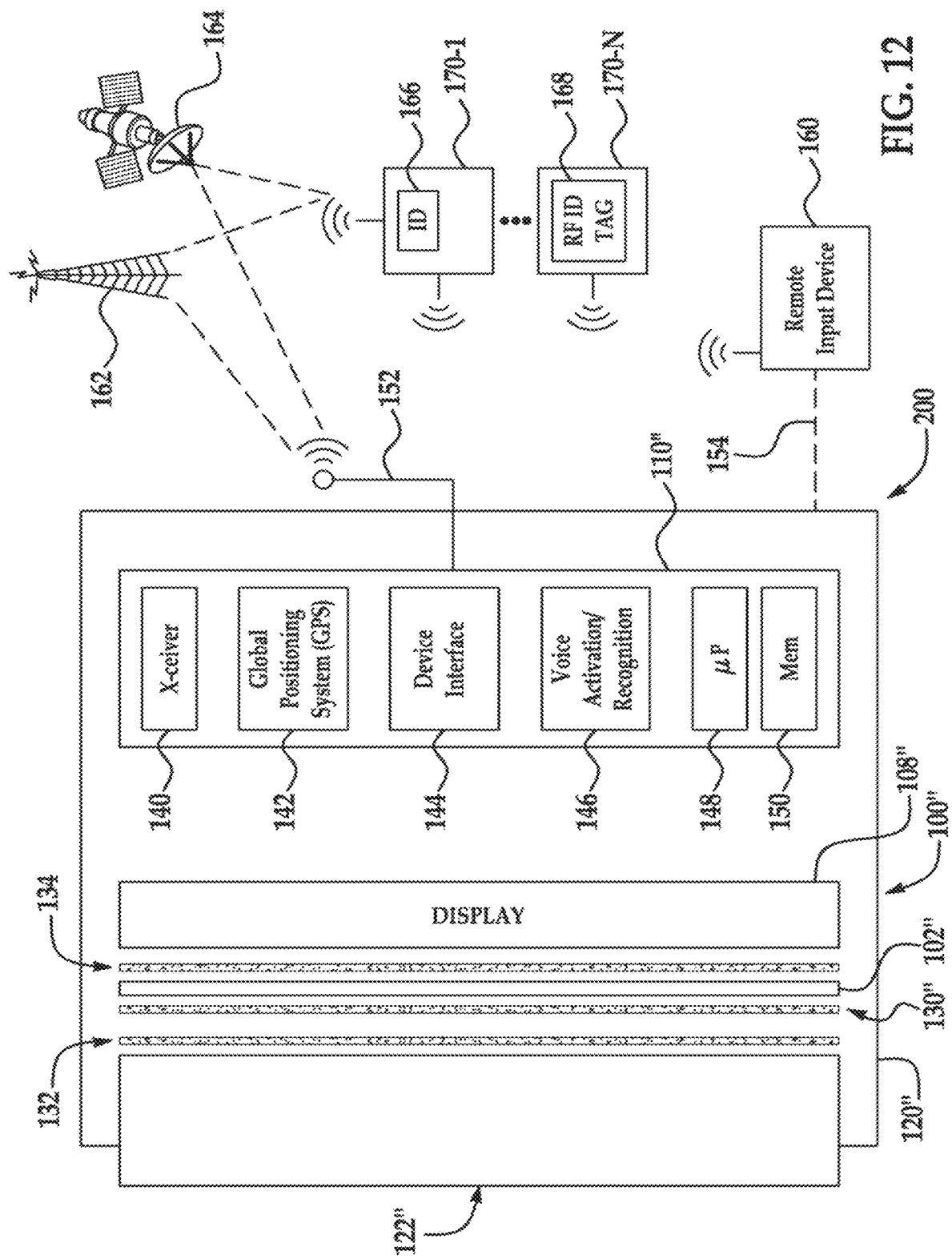
FIG. 12 is a block diagram illustrating operation of a system or method for tracking items proximate a user interface device having at least one touch sensitive region according to embodiments of the present disclosure.

FIG. 12 is a block diagram illustrating operation of a system or method for tracking items proximate a user interface/input device having at least one touch sensitive region according to embodiments of the present disclosure. System 200 includes a touch sensitive input device 100" having a sealed housing 120" that encloses a generally transparent touch sensitive active surface 122". As previously described, a sealed assembly provides a robust device for both permanent, fixed installations as well as removable mounting for portable hand-held use with solid state input suitable for use in challenging environments and applications. A generally transparent touch detection panel 102" is positioned between a display 108" and active surface 122". Housing 120" includes at least one printed circuit board 110" that cooperates with display 108" and sensor panel 108" to capture input from a user in proximity to, or in contact with, active surface 122". Circuit board 110" may include hardware, software, and/or firmware to perform various functions including those of a wireless transmitter/receiver (transceiver) 140, a position/location detection device, such as a global positioning system (GPS) 142, device interface 144, and voice activation 146, for example.

Device interface 144 may provide various input/output (I/O) functions such as raw data or signal conditioning, processing, and/or conversion, short-circuit protection, communication protocol processing, and the like. Device interface 144 may incorporate one or more dedicated hardware or firmware chips to condition and process particular signals. Circuit board 110" may include one or more microcontrollers or computers having a microprocessor 148 in communication with various types of temporary and persistent computer readable storage media, which are generally represented by memory 150. Computer readable storage media 150 may be implemented by any of a number of physical devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by microprocessor 148. The computer-readable storage media may also include floppy disks, CD-ROMs, hard disks, and the like depending on the particular application and implementation.

Similar to previously described embodiments, where capacitive sensing is employed, sensor layer 102" may be manufactured using a generally transparent material such as ITO and secured to the back side of surface 122" with a liquid spray adhesive 130" between the ITO and face plate. Spray adhesive 130" eliminates any air gap between the back surface of area 122" and sensor panel 102". A clear acrylic spray 132" or any clear spray may also be used on the rear surface of area 122" to create a uniform "wet" appearance and to further mask the effects of light entering through surface 122", reflecting from sensor panel 102", and exiting the face plate in addition to reducing visibility of any grid or array on sensor 102" illuminated by light from display 108". Applying a generally transparent coating or layer 132 to area 122" or a similar coating or layer 134 to the back side of panel 102" may also be used to reduce or correct for color shift associated with light transmission between different layers of ITO panel 102", display 108" and active surface 122". Applied coatings 130" and/or 134 may also provide additional protection for the ITO layer 102" to enhance durability and wear resistance, particularly in applications where one or more touch sensitive regions have exposed ITO.

As also illustrated in FIG. 12, device 100" may include an internal and/or external antenna 152 for wireless communication with one or more networks and/or devices as represented by radio frequency (RF) or cellular tower 162, satellite 164, objects or devices 170-1 to 170-n, and remote input device 160. Device interface hardware and/or software 142 cooperates with transceiver 140 and antenna 152 to wirelessly transmit and receive information using one or more standard communication technologies and protocols. Wireless communications capabilities may be used to communicate with cell phones, PDAs, laptops, and netbook computers as well as vehicle systems and accessories. Device 100" may utilize wireless communications standards such as WiFi, Bluetooth, 3G, ZigBee, Dash7 (ISO 18000-7), and the like, to remotely access a vehicle and its accessories, or receive information from surrounding tagged devices 170-1 to 170-n. Vehicle accessories equipped with wireless communications or linked on internal networks to devices having wireless communications capability may provide a wireless access point to communicate with the vehicle, cargo, or other tagged items in or around device 100". In one embodiment, input device 100" is implemented by a laptop or hand-held computer.

As previously described, a remote input device 160 may communicate with user interface/input device 100" via a wireless communication link and/or an optional wired link 154. Remote input device 160 may be implemented by a mouse, keypad, keyboard, track ball, touch pad, etc. Similar to user device 100", remote input device 160 may be permanently or removably mounted in a vehicle, such as illustrated and described with respect to FIG. 13, for example.

User interface/input device 100" may be used to locate and/or track one or more objects 170 having associated active or passive identification tags 166, 168, respectively. Tags 166, 168 may be implemented using radio frequency identification (RFID) technology to communicate at least identification information to device 100". Position information may also be transmitted, or may be determined indirectly by device 100" based on signal strength and/or direction for each tagged device.

Utilization of active and/or passive tags and the type of information stored and/or transmitted by a particular tag may depend on a number of considerations. In general, a passive tag does not contain its own power source, such as a battery. Power to transmit identification and/or location information is supplied by the polling or reading device 100" via antenna 152. When radio waves from antenna 152 are encountered by a passive RFID tag 168, an internal tag antenna and coil generate sufficient power to activate the tag and transmit some or all of its stored information encoded in a tag memory. Passive tags generally have a longer life than active tags, are less expensive to manufacture, and are much smaller. However, passive tags usually have a shorter useful range, typically on the order of several feet from device 100". Active tags have one or more internal power supply sources, such as a battery, electrovoltaic (solar cell), MEMS device, or radioactive isotope to provide on-board power that can be used as a partial or complete source of power for the tag circuitry and antenna. Active tags can generally be read at distances of one hundred to several hundred feet or more, greatly improving their utility and flexibility for a number of applications. They may also include other sensors that can use electricity for power, such as a location or motion sensor, for example. However, active tags are generally larger and more expensive to manufacture than passive tags.

Embodiments of the present disclosure are generally independent of the particular type of identification tag 166, 168 and the particular communication strategy employed, both of which may vary depending on the particular application. Tracked objects or devices 170 may employ one or more identification tags 166, 168, which may use various communication strategies intended for low-power, low-bandwidth digital communications, such as Bluetooth, ZigBee, or Dash-7, for example. Those of ordinary skill in the art may recognize operational characteristics of a particular type of tag or communication strategy that provide advantages for particular applications. For example, tags employing a communication strategy using a relatively longer wavelength, such as Dash-7, may be able to penetrate surrounding obstacles made of metallic materials or concrete better than tags using ZigBee, or Wi-Fi, for example. A single identification tag 166 or 168 may be associated with more than one tracked item or object. For example, a single tag may be associated with a bin, pallet, or other container associated with multiple tracked objects. Likewise, different types of identification tags may be used for different types of objects. For example, more sophisticated active tags may be used to identify more valuable objects with less expensive passive tags used for less valuable objects or items.

In one embodiment, system 200 is used to track items, object, and/or equipment 170 that is to be utilized for a particular project, such as a construction project. Items, objects, and/or equipment 170 useful for a particular job or project include associated wireless identification tags 166, 168 that communicate with user interface/input device 100" and may include tools and equipment as well as construction materials, for example. A list of items needed for the project is transmitted or provided to device 100" and the corresponding items are collected and placed in a vehicle for delivery to the job site. Device 100" may poll or query particular items 170, or may broadcast a general request for any tagged objects within range to respond. Alternatively, or in combination, any active ID tags 166, 168 may periodically transmit identification information, or transmit identification information when movement of the object is detected, for example. Device 100" detects location and/or proximity of items 170 within range and determines whether all items listed for the project or for a particular delivery vehicle are present. Depending on the particular application, proximity of objects 170 to user device 100" may be determined by signal strength and direction of responding ID tags 166, 168, and/or by position coordinates of particular objects relative to position coordinates of device 100" with position coordinates determined using GPS system 142 and satellites 164, cellular network 162, and/or similar position/location determination strategies.

Device 100" may include various features to provide logistics management for identifying and tracking items 170. In one embodiment, device 100" determines whether all items 170 identified by a project list are located within proximity of device 100" and provides a corresponding alert or acknowledgment to a user. Project lists may include various categories of items with associated properties. For example, categories could include one category of items that are expected to remain within proximity of device 100", such as tools and/or equipment, and another category of items that are expected to be separated from device 100", such as construction materials or consumables, for example. Device 100" may provide an alert to an operator in response to one or more items 170 changing position, moving away from device 100", and/or moving out of range/proximity, for example.

Use of system 200 in logistics management or project tracking may provide a number of advantages. For example, object tracking using a solid-state touch sensitive user interface 100" may improve efficiency by assuring that all useful items (tools, equipment, materials) are present for a particular project while providing a convenient, portable hand-held device suitable for the challenging environments often encountered in such applications. Similarly, item tracking may be used to manage equipment inventory to reduce lost equipment or identify unauthorized movement of equipment or goods.

Figure 13:
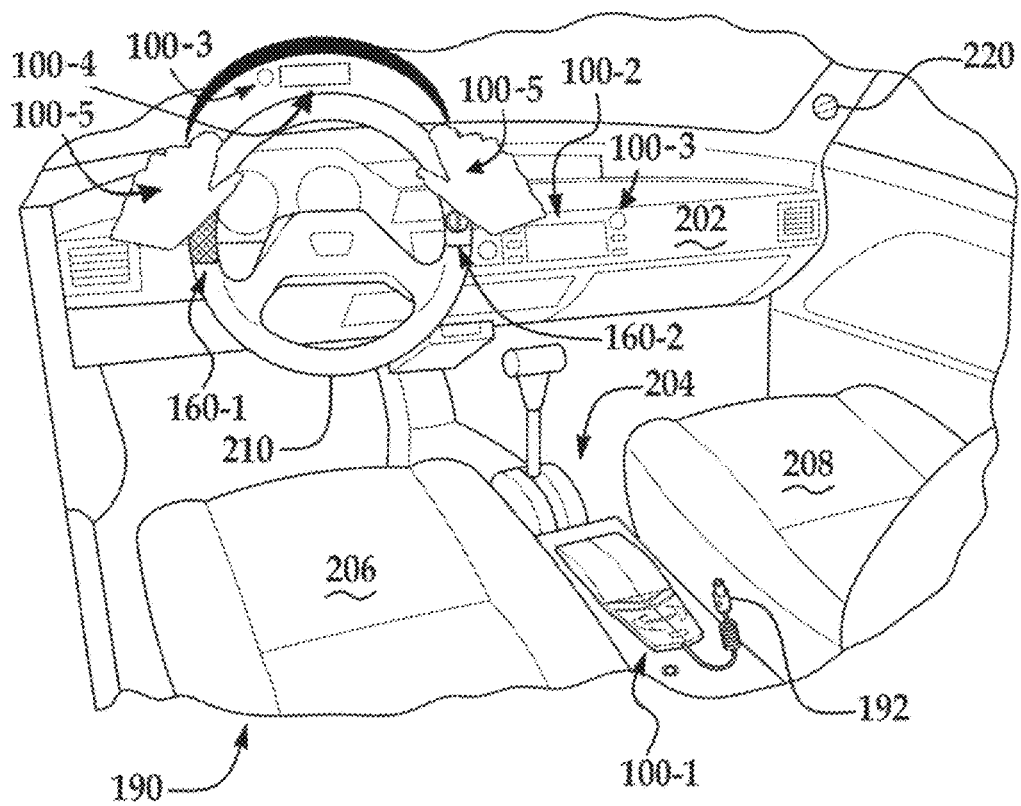
FIG. 13 is a diagram illustrating operation of one embodiment of a user interface device having at least one touch sensitive region in a representative application according to the present disclosure.

FIG. 13 illustrates a representative application for user interface/input devices having at least one touch sensitive region according to the present disclosure. Vehicle interior 190 includes a removably mounted user interface/input device 100-1 as well as a fixed or permanently mounted user interface/input device 100-2. Device 100-2 is mounted in dashboard or instrument panel 202, while device 100-1 is removably mounted in center stack console 204 between a driver seat 206 and passenger seat 208. Vehicle interior 190 may include an integrated or dedicated mounting location and/or hardware for device 100-1, although a particular location or mounting device is not required. Device 100-1 may include a data/power cord 192 to provide a wired connection to various vehicle systems or networks, to charge an internal battery, and/or to power device 100-1. Device 100-1 may also communicate wirelessly using a proprietary to standard communication strategy to exchange data with vehicle 190 and/or portable user electronics and tracked objects or items as previously described. Devices 100-1 and 100-2 may share or duplicate various functions for controlling vehicle accessories, and/or personal electronics as well as tracking one or more objects as described herein. Redundant control of one or more vehicle functions or accessories using devices 100-1 and 100-2 would provide accessory controls for vehicle occupants when device 100-1 is removed from the vehicle, for example. Alternatively, each device 100-1 and 100-2 may have separate dedicated features/functions depending on the particular application.

A removable, portable device 100-1 affords various advantages to users. For example, an operator can receive real time vehicle status while away from vehicle 190. Likewise, an operator can control vehicle accessories using device 100-1 and/or using personal electronic devices wirelessly linked to device 100-1 and/or 100-2 from outside the vehicle or away from the instrument panel 202. Remote communications with the vehicle also allows an operator to monitor vehicle security status. Vehicle features/accessories such as climate control, sunroof, and window lift controls can be accessed to adjust vehicle ventilation and temperature characteristics. Personal electronic devices can connect with vehicle accessories like audio headsets/earphones and video players to share AV files and information. Likewise, wireless portable devices can link with vehicle electronics to exchange information like contact lists, appointments, notes, etc.

As also illustrated in FIG. 13, vehicle interior 190 may include one or more remote input devices 160-1 and 160-2 in communication with device 100-1 and/or device 100-2. Remote input devices 160-1 and/or 160-2 may communicate with associated devices 100-1 and/or 100-2 via a wired, wireless, or combination wired/wireless communication link. For example, remote input device 160-1 may have a wired connection to a vehicle system/network that wirelessly communicates input to device 100-1 and/or 100-2. In the representative embodiment illustrated, one or more input devices 160 are mounted on steering wheel 210. Remote input device 160-1 is implemented by a touch pad or touch sensor, while remote input device 160-2 is implemented by a track ball or mouse. Of course, other types of remote input devices may be provided and mounted in various locations within vehicle 190 for convenient access by a driver or other occupant. Audio input may be provided to device 100-1 and/or 100-2 using one or more embedded microphones 220. Speech recognition may be provided by the vehicle systems with corresponding data provided to devices 100. Alternatively, the speech signal may be provided for processing by a speech recognition subsystem embedded within one or more devices 100.

The user interface 100-2 may also utilize at least one camera. The camera can be powered by using the battery supply of the vehicle, using interchangeable batteries, or by using a rechargeable battery that is connected to a solar cell on the camera. The camera(s) can be mounted to the user interface 100-2 or anyplace within the cockpit represented by FIG. 13. The camera can feed a video stream using a wired connection, a wireless connection, or the like. The user interface can use the camera on its own, to determine gestures, or in conjunction with other capacitive touch pads 160-1 and 160-2.

One example of such a system would have a camera 100-3 mounted directly in front of the driver. The user interface 100-2 would then capture video data from camera 100-3 to determine a driver's gesture. The driver could move either hand 100-5 on the steering wheel 210 to adjust radio settings, navigation, change the menu on a heads up display 100-4, or the like. The user interface 100-2 could also track the driver's eyes using camera 100-3. If the user interface 100-2 does not obtain input from the camera 100-3 regarding the driver's eyes for a pre-determined period of time an alarm could sound to get the driver's attention. There are significant safety advantages for such a system. The driver can get vehicle information without looking away from the road, which can contribute to preventing an accident by keeping the driver's attention on the road.

Another safety example would utilize the camera 100-3 mounted at the user interface 100-2. In this example the user interface 100-2 could determine who is trying to use the interface by getting the video feed from camera 100-3 mounted directly at the user interface 100-2. If the driver tries to access the user interface 100-2 while the vehicle is moving, the user interface 100-2 can lock them out and sound an alert. If the passenger tries to access the interface all functions are permitted. This forces the driver to focus on the road. The user interface 100-2 can interpret who is using the interface by using the camera to detect which direction the touch is coming from. If the camera feed indicates the drivers face or an approaching hand or arm from the driver's side of the vehicle, it can determine that the driver is attempting to gain access to the user interface. The video feed from the camera 100-3 may indicate that a passenger is attempting to access the user interface 100-2 in which case such access is permitted while the vehicle is moving.

In one example, the driver may use the user interface 100-2 features if the driver is focused on the road. The camera 100-3 provides video feed information indicating a direction in which the driver's eyes are looking. The processor of the user interface 100-2 determines, within some pre-programmed level of certainty, whether the driver is looking straight ahead (e.g., focused on driving). If so, the driver may use a hand or finger gesture in proximity of the steering wheel 201 to indicate a desired operation. If the driver's eyes do not appear to be focused on the road based on information from the camera 100-3, then the driver may not be permitted to access the functionality of the user interface 100-2. Similarly, the driver may need to keep her hands on or near the steering wheel, which can be discerned from the camera 100-3, to have access to the functionality of the user interface 100-2.

There are also convenience considerations with a user interface system 100-2 and a dash mounted camera 100-3. One such example involves a truck with a snowplow. The driver never has to remove their hands 100-5 from the steering wheel 210 to make an adjustment to the plow orientation or position. When the user wants the plow to go in a particular direction they simply need to gesture with a finger in the direction they would like the plow to move. The user interface 100-2 uses the camera 100-3 to capture the gesture, interpret its meaning and send a message to the plow controller to move the plow. Alternatively, whole hand gestures could be used by the driver using one hand while keeping the other hand on the steering wheel. The hand motions would be interpreted by the interface 100-2 as seen by the camera 100-3.

A user interface utilizing a camera for gesture recognition can also be used in a keyless entry configuration. There are some problems with many hands free keyless entry systems to detect an operator before touching the vehicle. One problem is the effective range of the system. A capacitive system typically has a sensing range of less than ten inches. In this case the keyfob could be used but becomes a hindrance when the user's hands are full. The user also can touch a specific area of the vehicle to gain entry, but this also is a hindrance when the user's hands are full. Another problem with a hands free keyless entry system is the power consumption required to run these systems to detect a person at a distance more than 3 feet when the vehicle is turned off. Using a camera based user interface system on the rear trunk, lift gate, door, or the like with a self-contained power source eliminates the range and touching issues. By using a camera in a hands free keyless entry system the effective range can be increased to 5-10 ft. For example a user approaching the vehicle with both hands full may use body or head movements to tell the system they are the authorized user and request that the system open the trunk. The user can have more than one gesture to activate the hands free keyless entry. To reduce power consumption, the camera entry system will go into sleep mode when it determines there is no person or a stationary object for a period of time. This can be set to any desired time such as: on 200 ms, off 25$s$ or any combination to detect a person 3-5 ft away and look for a gesture.

Figure 15:
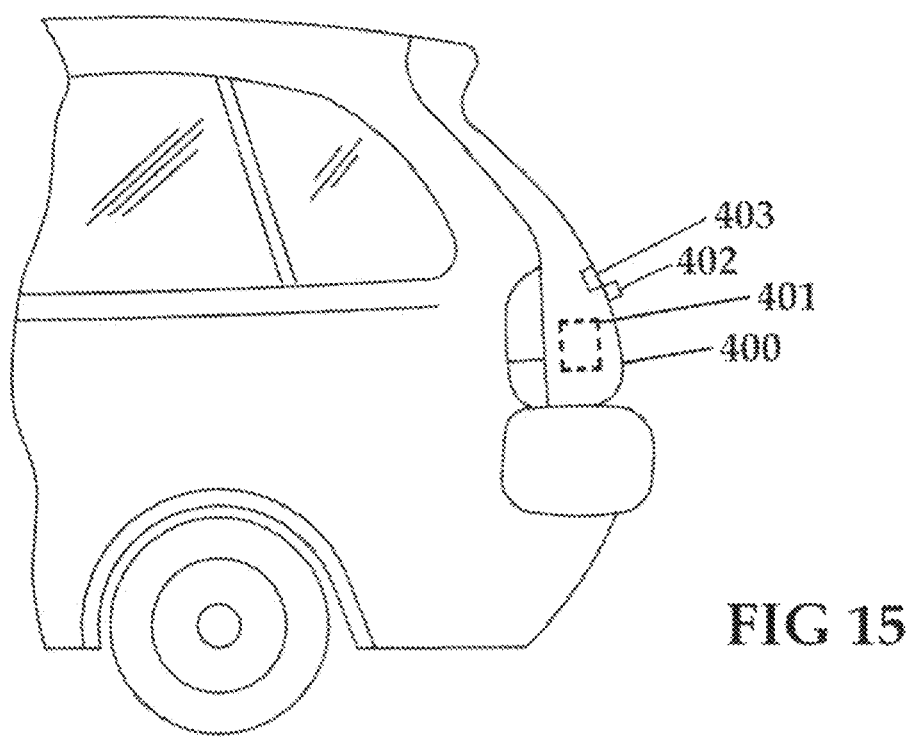
FIG. 15 schematically shows another user interface and sensor arrangement and illustrates operation of a system for providing a hands free keyless entry.

FIG. 15 is an example of a hands free keyless entry system utilizing a user interface 401 and a camera 402 attached to a rear lift gate 400. The user approaches the lift gate 400 and is recognized by the user interface 401 through the camera 402. User recognition in some embodiments is based on the camera detecting any individual within the field of vision of the camera. In other embodiments an authorized user is recognized based on facial recognition using a known technique or by the user providing some indication, such as a gesture, that is recognized by the system as an authorization input. Once a recognized user performs a head, hand, leg, or body gesture that is recognized by the user interface 401 and the lift gate 400 is opened. To prevent excessive power consumption the user interface 401 has an internal rechargeable battery that is recharged via a solar cell 403.

Figure 14:
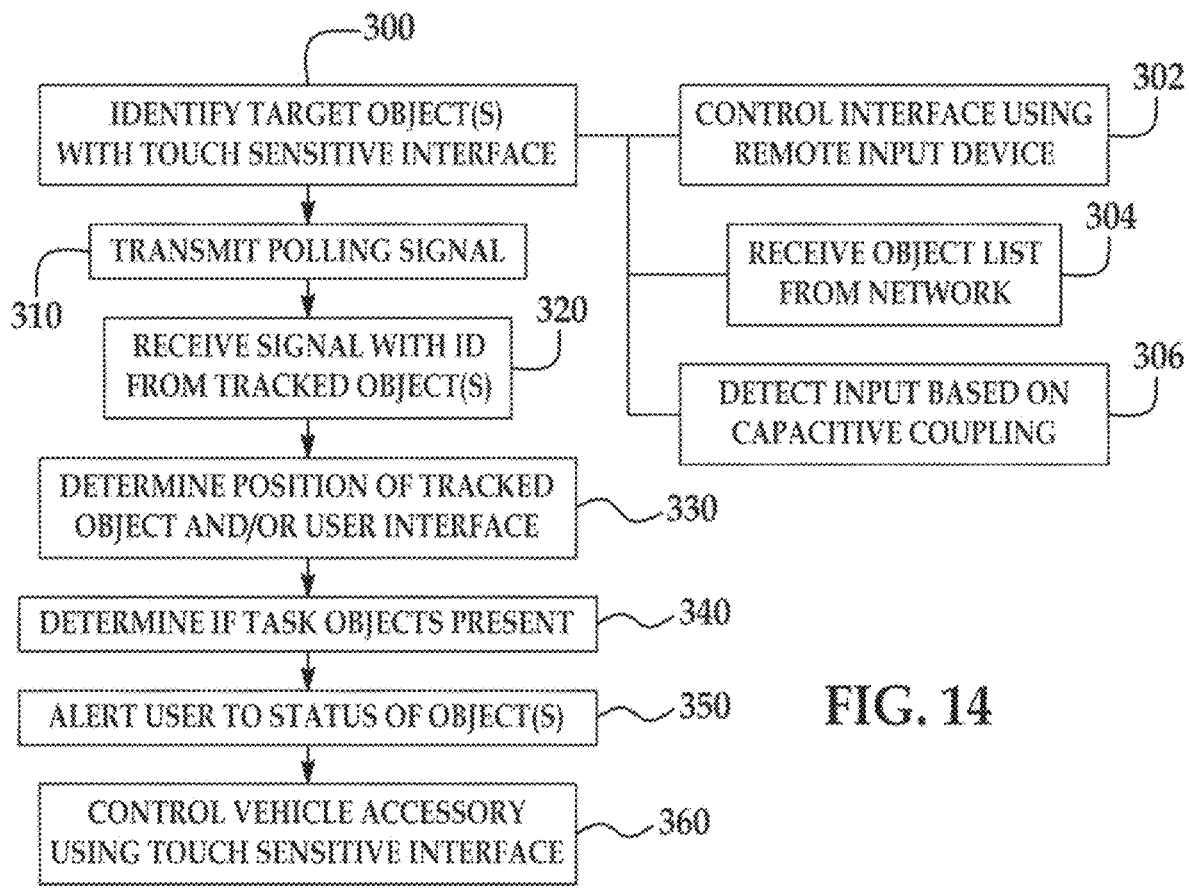
FIG. 14 is a diagram illustrating operation of a system or method for providing user input via a touch sensitive user interface/input device according to embodiments of the present disclosure.

FIG. 14 is a flow chart illustrating operation of a system or method according to the present disclosure. FIG. 14 illustrates various features of a representative system or method that may be implemented in hardware and/or software. Software features are generally represented by corresponding control strategy and/or logic stored as instructions or code executed by at least one microprocessor-based computer or controller. Code may be processed using any of a number of known strategies such as event-driven, interrupt-driven, multi-tasking, multi-threading, and the like. As such, various steps or functions illustrated may be performed in the sequence illustrated, in parallel, or in some cases omitted. Although not explicitly illustrated, one of ordinary skill in the art will recognize that one or more of the illustrated functions may be repeatedly performed depending upon the particular processing strategy being used. Similarly, the order of execution is not necessarily required to achieve the features and advantages described herein, but is provided for ease of illustration and description. Software, program code, or instructions may be stored in one or more computer-readable storage media accessible to the computer or controller. The computer-readable storage media may include one or more of a number of known physical devices which utilize electric, magnetic, optical, and/or hybrid storage to provide temporary and/or persistent storage of executable instructions and associated data, operating variables, and the like.

As represented by block 300 of FIG. 14, one embodiment of a system or method according to the present disclosure includes identifying at least one target object associated with a target task or project using a touch-sensitive user interface device. The user may operate the touch-sensitive user interface to identify objects, such as tools, equipment, construction materials, etc. for a particular project for a construction application. For a delivery or logistics application, identified objects may represent packages, bins, pallets, etc. for a particular location, area, or route, for example. Alternatively, or in combination, the user may manipulate a remote input device in communication with the user interface device, such as a mouse, track ball, stylus, touch pad, or the like as represented by block 302. The user interface device may be permanently or removably mounted in a vehicle with the remote input device mounted to a steering wheel, center console, or instrument panel, for example, as previously described. The touch-sensitive user interface device may be used to directly enter object identification information using a menu, keyboard, or keypad displayed by the user interface device and/or may be obtained from a wired or wireless network connection as represented by block 304. In one embodiment, the system or method include detecting user input based on capacitive coupling of the user in proximity or contact with one or more touch-sensitive regions of the user interface device as represented by block 306.

Depending on the particular strategy used to identify tracked objects, the system or method may optionally transmit a polling signal to activate passive-type identification tags as represented by block 310. A polling signal may be transmitted periodically and/or in response to a particular command or request generated by the user or triggered by occurrence of an event, for example. The polling signal may be received by tracked objects within proximity of the user device to activate or read the identification information from those objects. Alternatively, active identification tags may periodically transmit an identification and/or location signal. Whether transmitted by an active or passive tag, an identification signal associated with the tracked object(s) within proximity of the user interface device is received as represented by block 320. The received signal may be used to determine the position of each tracked object relative to the user interface device. In one embodiment, tracked objects transmit position/location information using GPS coordinates determined by GPS satellites. Proximity of tracked items may also be inferred based on signal characteristics, such as signal direction and strength, for example. Location information for tracked objects may also be determined indirectly via a wireless or wired network connection. For example, tracked objects may transmit identification and/or position information to a base station or relay station with the information forwarded to a user interface device via a wireless or wired network connection.

Identification information for one or more tracked objects may be used to determine whether the previously identified objects are present within a particular area or proximity of the user interface device as represented by block 340. The particular area, proximity, or range to determine "presence" may be specified by the user and may vary depending on the particular application. The user interface device may generate an alert for the user with respect to the status of one or more tracked objects as represented by block 350. For example, the user interface device may generate an alert that all items specified for a particular list are within the designated proximity to be "present". An alert may be generated indicated that one or more tracked objects have changed position/location, or that one or more tracked objects have moved out of a particular proximity or range of the user interface device. Various other types of status messages or alerts may be specified depending on the particular application.

In addition to providing an interface to a tracking or logistics management system, the user interface device may be used to control one or more vehicle accessories or personal electronic devices as represented by block 360. As such, the user interface device provides flexibility for use with a variety of vehicle-related applications while affording a single user interface that may be portable and robust for use in challenging environments.

While embodiments of the present disclosure have been illustrated and described, it is not intended that these embodiments illustrate and describe all possible forms of the present disclosure. Rather, the words used in the specification are words of description rather than limitation, and it is understood that various changes may be made without departing from the spirit and scope of the present disclosure.

What is claimed is:

1. A user interface, comprising:
 a display fixedly mounted to a vehicle and including a touch sensitive active surface, a transparent touch detection panel positioned between the display and the touch sensitive active surface, the transparent touch detection panel including a surface and an array of electrically conductive conductors and a transparent layer adjacent the surface;

a processor in communication with the display, the processor being configured to obtain information regarding a user interaction with at least one touch-sensitive region of the touch sensitive active surface;

at least one camera adapted to be fixedly mounted to either one of an interior and exterior of the vehicle and in communication with the processor, the at least one camera observing an area of the vehicle on which the at least one camera is supported, the at least one camera to provide an indication to the processor when an individual is in a field of vision of the at least one camera;

at least one sensor operable for detecting an object in a vehicle seat assembly of the vehicle, the at least one sensor comprising a conductor disposed within the vehicle seat assembly with an electrical signal applied to the conductor to output as an object signal that is detected during proximity or surface contact when a conductive object is present in the vehicle seat assembly and capacitively coupling with the conductive object;

the processor in communication with the at least one sensor, and the at least one camera, the processor being operable to monitor the at least one sensor and the at least one camera;

touch switch drive and detection electronics in communication with the processor, the touch switch drive and detection electronics driving the at least one touch-sensitive region with an electrical charge and to generate signals indicative of activation of the at least one touch-sensitive region in response to the user interaction with the at least one touch-sensitive region of the touch sensitive active surface; and wherein the processor determines whether the conductive object is in the vehicle seat assembly by detecting the object signal and, if the conductive object is in the vehicle seat, to determine if the conductive object is manipulating the display.

2. The user interface as set forth in claim 1 including at least one of one or more occupant indicators and vehicle status indicators.

3. The user interface as set forth in claim 2 wherein the one or more vehicle status indicators comprise at least one of whether the vehicle is moving and stationary, vehicle speed, doors open and closed, engine running and stopped, parking brake set and released, and airbag activated and deactivated.

4. The user interface as set forth in claim 2 wherein the one or more occupant indicators comprise whether an occupant is seated, whether a seatbelt is latched, and whether a stored preference selector is selected.

5. The user interface as set forth in claim 1 wherein the user interface controls at least one of accessibility to various functions and customizes the user interface display and controls based on which occupant is manipulating the user interface.

6. The user interface as set forth in claim 1 including at least one of vehicle information and ambient status information to determine at least one of the user interface configuration, display features, and available functions.

7. The user interface as set forth in claim 1 wherein the touch switch drive and detection electronics can one of be collocated with the touch-sensitive region on the touch-sensitive active surface and separated from the user interface by an electrically conductive wire.

8. The user interface as set forth in claim 1 including a sealed housing and wherein the touch switch drive and detection electronics are integrated into the sealed housing with other components.

9. The user interface as set forth in claim 1 including accessory control electronics to communicate at least one of input and receive output from one or more associated devices.

10. The user interface as set forth in claim 9 wherein the accessory control electronics are operable to control functions of the associated devices with the user interface in response to activation of one or more touch-sensitive region.

11. The user interface as set forth in claim 10 wherein the accessory control electronics receive touch activation signals from the touch switch drive and detection electronics over an electrically conductive wire.

12. A user interface, comprising:
a display fixedly mounted to a vehicle and including a touch sensitive active surface, a transparent touch detection panel positioned between the display and the touch sensitive active surface, the transparent touch detection panel including a surface and an array of electrically conductive conductors and a transparent layer adjacent the surface;

a processor in communication with the display, the processor being configured to obtain information regarding a user interaction with at least one touch-sensitive region of the touch sensitive active surface;

at least one sensor operable for detecting an object in a vehicle seat assembly of the vehicle, the at least one sensor comprising a conductor disposed within the vehicle seat assembly with an electrical signal applied to the conductor to output as an object signal that is detected during proximity or surface contact when a conductive object is present in the vehicle seat assembly and capacitively coupling with the conductive object, the processor in communication with the at least one sensor, the processor being operable to monitor the at least one sensor;

touch switch drive and detection electronics in communication with the processor, the touch switch drive and detection electronics driving the at least one touch-sensitive region with an electrical charge and to generate signals indicative of activation of the at least one touch-sensitive region in response to the user interaction with the at least one touch-sensitive region of the touch sensitive active surface; and wherein the processor determines whether the conductive object is in the vehicle seat assembly by detecting the object signal and, if the conductive object is in the vehicle seat, to determine if the conductive object is manipulating the display.

13. A user interface, comprising:
a display fixedly mounted to a vehicle and including a touch sensitive active surface, a transparent touch detection panel positioned between the display and the touch sensitive active surface, the transparent touch detection panel including a surface and an array of electrically conductive conductors and a transparent layer adjacent the surface;

a processor in communication with the display, the processor being configured to obtain information regarding a user interaction with at least one touch-sensitive region of the touch sensitive active surface;

at least one sensor operable for detecting an object in a vehicle seat assembly of the vehicle, the at least one sensor comprising a conductor disposed within the vehicle seat assembly with an electrical signal applied to the conductor to output as an object signal that is detected during proximity or surface contact when a conductive object is present in the vehicle seat assembly and capacitively coupling with the conductive object;

one or more occupant indicators and vehicle status indicators, wherein the one or more vehicle status indicators comprise at least one of whether the vehicle is moving and stationary, vehicle speed, doors open and closed, engine running and stopped, parking brake set and released, and airbag activated and deactivated and the one or more occupant indicators comprise whether an occupant is seated, whether a seatbelt is latched, and whether a stored preference selector is selected;

the processor in communication with the at least one sensor, and the processor being operable to monitor the at least one sensor and the one or more occupant indicators and the vehicle status indicators;

touch switch drive and detection electronics in communication with the processor, the touch switch drive and detection electronics driving the at least one touch-sensitive region with an electrical charge and to generate signals indicative of activation of the at least one touch-sensitive region in response to the user interaction with the at least one touch-sensitive region of the touch sensitive active surface; and wherein the processor determines whether the conductive object is in the vehicle seat assembly by detecting the object signal and, if the conductive object is in the vehicle seat, to determine if the conductive object is manipulating the display.

* * * * *